United States Patent
Gilkey et al.

(10) Patent No.: US 11,563,291 B2
(45) Date of Patent: Jan. 24, 2023

(54) LOW PROFILE ELECTRICAL CONNECTOR SYSTEM WITH DIFFERENTIAL PAIR CABLE INTERFACE

(71) Applicant: Molex, LLC, Lisle, IL (US)

(72) Inventors: David Gilkey, Lisle, IL (US); Paul A. Reisdorf, Lisle, IL (US); Paul Gray, Lisle, IL (US); Michael J. Demore, Lisle, IL (US); Sungjong Yoo, Lisle, IL (US); Ali Javed, Lisle, IL (US)

(73) Assignee: Molex, LLC, Lisle, IL (US)

( * ) Notice: Subject to any disclaimer, the term of this patent is extended or adjusted under 35 U.S.C. 154(b) by 277 days.

(21) Appl. No.: 16/960,018

(22) PCT Filed: Jan. 4, 2019

(86) PCT No.: PCT/US2019/012260
§ 371 (c)(1),
(2) Date: Jul. 3, 2020

(87) PCT Pub. No.: WO2019/136199
PCT Pub. Date: Jul. 11, 2019

(65) Prior Publication Data
US 2021/0066857 A1    Mar. 4, 2021

Related U.S. Application Data

(60) Provisional application No. 62/614,048, filed on Jan. 5, 2018.

(51) Int. Cl.
*H01R 9/03* (2006.01)
*H01R 13/6474* (2011.01)
(Continued)

(52) U.S. Cl.
CPC ....... *H01R 13/6474* (2013.01); *H01R 12/724* (2013.01); *H01R 12/75* (2013.01);
(Continued)

(58) Field of Classification Search
CPC ............ H01R 13/6474; H01R 13/6477; H01R 13/6587; H01R 13/50; H01R 13/502;
(Continued)

(56) References Cited

U.S. PATENT DOCUMENTS 5,417,590 A    5/1995  Dechelette et al.
5,967,844 A   10/1999  Doutrich et al.
(Continued)

FOREIGN PATENT DOCUMENTS

CN    2552173 Y    5/2003
CN  103531964 A    1/2014
(Continued)

OTHER PUBLICATIONS

Extended European Search Report and Opinion received for EP Application No. 19735786.6, dated Dec. 17, 2021, 11 pages.
Office Action received for CN Application No. 201980016680.7, dated Apr. 2, 2021, 22 Pages. (13 Pages of English Translation and 9 Pages of Official notification).
(Continued)

*Primary Examiner* — Khiem M Nguyen

(57) ABSTRACT

An electrical connector includes a differential signal pair. A portion of each terminal is disposed in an insulative housing and an electrically conductive shield extends around at least a portion of the terminals and a least a portion of the housing. The housing may have a lower surface and a projection extending downward from the lower surface between a portion of a vertical section of each of the terminals. The terminals may have an angled section including a vertical portion having a first width, an angled portion narrower than the vertical portion, and a horizontal portion narrower than the angled portion. The housing may have a housing mating component spaced from a housing body component and aligned with but spaced from the terminals. The terminals may have a planar termination section with a first portion wider than a second portion.

12 Claims, 41 Drawing Sheets

(51) Int. Cl.
*H01R 12/72* (2011.01)
*H01R 12/75* (2011.01)
*H01R 13/6477* (2011.01)
*H01R 13/6587* (2011.01)
*B60R 16/023* (2006.01)
*H01R 13/50* (2006.01)
*H01R 13/502* (2006.01)
*H01R 13/6461* (2011.01)

(52) U.S. Cl.
CPC ..... *H01R 13/6477* (2013.01); *H01R 13/6587* (2013.01); *B60R 16/0238* (2013.01); *H01R 13/50* (2013.01); *H01R 13/502* (2013.01); *H01R 13/6461* (2013.01); *H01R 2201/04* (2013.01); *H01R 2201/26* (2013.01)

(58) Field of Classification Search
CPC .. H01R 13/6461; H01R 12/724; H01R 12/75; H01R 2201/04; H01R 2201/26; B60R 16/0238
USPC .......................................... 439/607.01–607.4
See application file for complete search history.

(56) References Cited

U.S. PATENT DOCUMENTS

| | | |
|---|---|---|
| 9,496,655 B1 | 11/2016 | Huang et al. |
| 10,741,957 B2 | 8/2020 | Hara et al. |
| 2003/0017730 A1 | 1/2003 | Bassler et al. |
| 2003/0134529 A1 | 7/2003 | Murr et al. |
| 2004/0094328 A1 | 5/2004 | Fjelstad et al. |
| 2007/0059982 A1 | 3/2007 | Fogg et al. |

FOREIGN PATENT DOCUMENTS

| | | |
|---|---|---|
| CN | 105247744 A | 1/2016 |
| CN | 107221812 A | 9/2017 |
| CN | 206639956 U | 11/2017 |
| EP | 0774807 A2 | 5/1997 |
| WO | 2016/195849 A1 | 12/2016 |
| WO | 2019/136199 A2 | 7/2019 |

OTHER PUBLICATIONS

International search report and written opinion received for PCT application No. PCT/US2019/012260, dated Aug. 5, 2019, 12 pages.

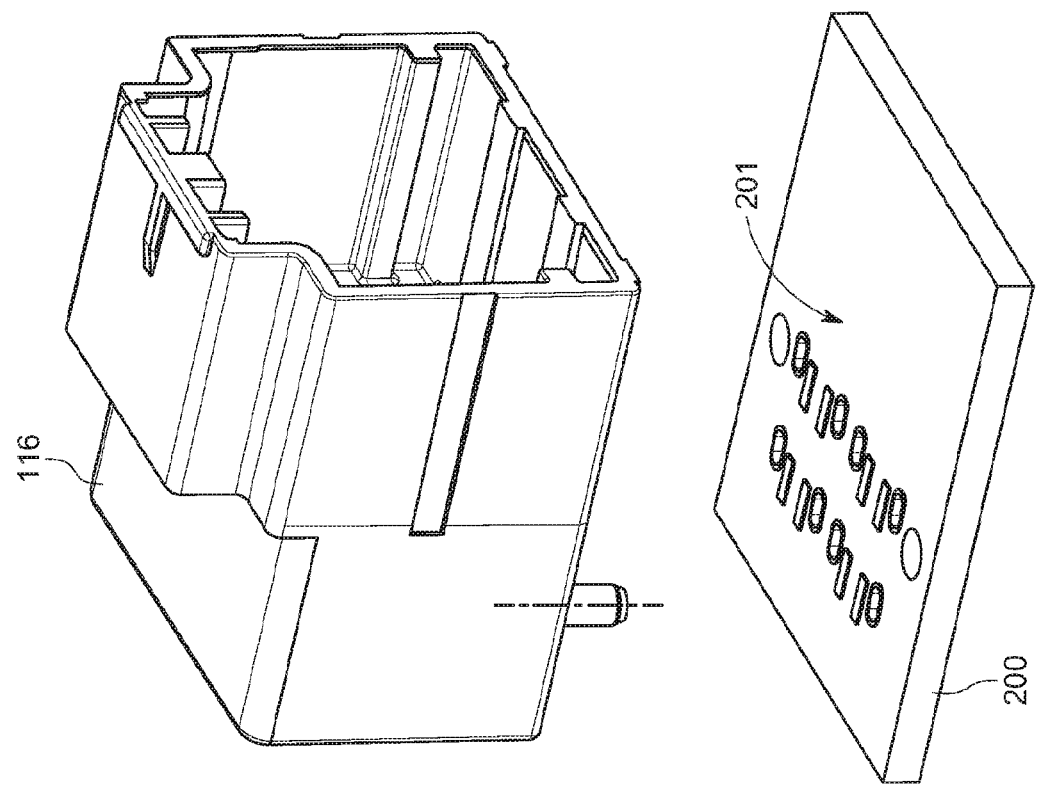
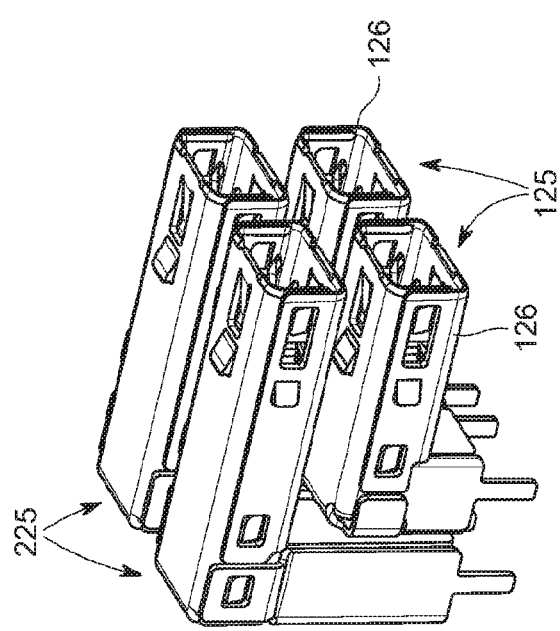
FIG. 26

LOW PROFILE ELECTRICAL CONNECTOR SYSTEM WITH DIFFERENTIAL PAIR CABLE INTERFACE

RELATED APPLICATIONS

This application claims priority to International Application No. PCT/US 19/12260, filed Jan. 4, 2019, which in turn claims priority to U.S. Provisional Application No. 62/614,048, filed Jan. 5, 2018, both applications are incorporated herein by reference in their entirety.

FIELD OF THE INVENTION

The present invention relates to the field of electrical connectors and, in particular, multi-conductor shielded and unshielded electrical connectors used in cable harnesses of vehicles.

DESCRIPTION OF RELATED ART

Typically traditional wire harness manufacturing presents a "single wire" approach to the manufacture of wire harnesses used in vehicles (i.e., a single lead wire is terminated to a terminal). With significant increases in the volume and complexity of in-car electronics, networking solutions that offer low-cost, high speed transmission and bandwidth are becoming ever more necessary. In many instances, certain applications require high data rate transfer and use of a balanced or impedance tuned differential pair transmission links is required

BRIEF SUMMARY

A connector system is provided that is used with a wire harness to interconnect these various devices. The connector system includes a first connector and a second connector for complete mechanical and electrical connection and utilizes a shielded twisted pair or twin-ax cabling system. The connectors include a pair of spatially and geometrically arranged electrical terminals configured within a shielded sub-connector or module that are retained in the first and second connecters of the connector system.

To better understand the above-described objectives, characteristics and advantages of the present invention, embodiments, with reference to the drawings, are provided for detailed explanations.

BRIEF DESCRIPTION OF THE DRAWINGS

The present invention is illustrated by way of example and not limited in the accompanying figures in which like reference numerals indicate similar elements and in which:

FIG. 26 depicts a partially exploded front perspective view of the connector of FIG. 24;

DETAILED DESCRIPTION

Figure 1:
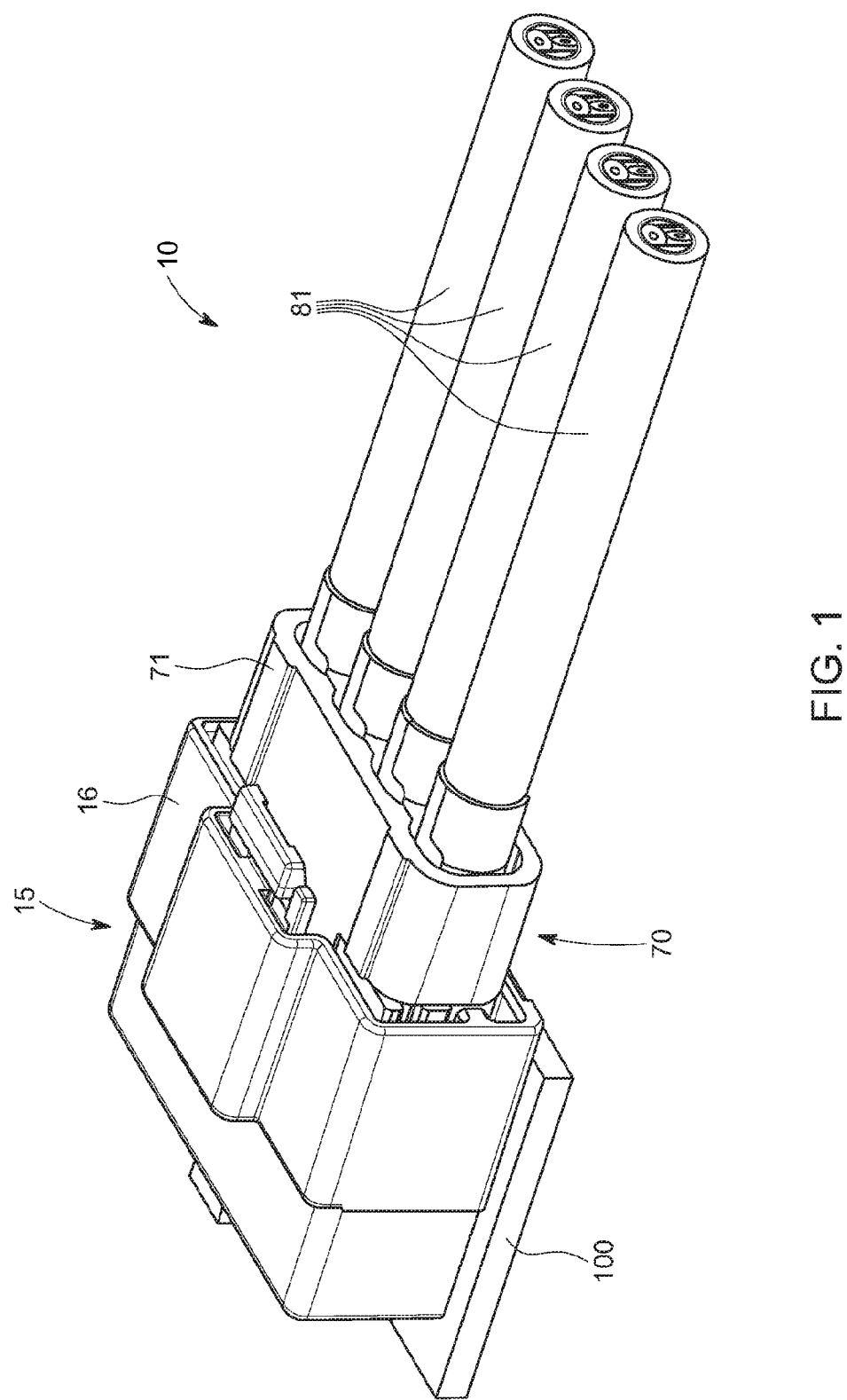
FIG. 1 depicts a perspective view of a vehicle harness connector assembly according to a first embodiment of the present disclosure.

The detailed description that follows describes exemplary embodiments and is not intended to be limited to the expressly disclosed combination(s). Therefore, unless otherwise noted, features disclosed herein may be combined to form additional variations that were not otherwise shown for purposes of brevity.

While the preferred embodiment of the invention have been shown and described, it will be apparent to those skilled in the art that changes and modifications may be made therein without departing from the spirit of the invention, the scope of which is defined by the appended claims. Like members are designated by like reference characters.

The term "Connected Car" is an umbrella term used to encompass many elements of in-car connectivity from infotainment to assisted vehicle technology and full autonomy. Additional uses include vehicles that communicate with each other and the associated outside infrastructure combined with the growing use of mobile devices and other new driver-assistance technologies. The use of Ethernet technology will join together all of a car's electronics systems, including the instrument cluster, the infotainment and the telematics systems.

Figure 2:
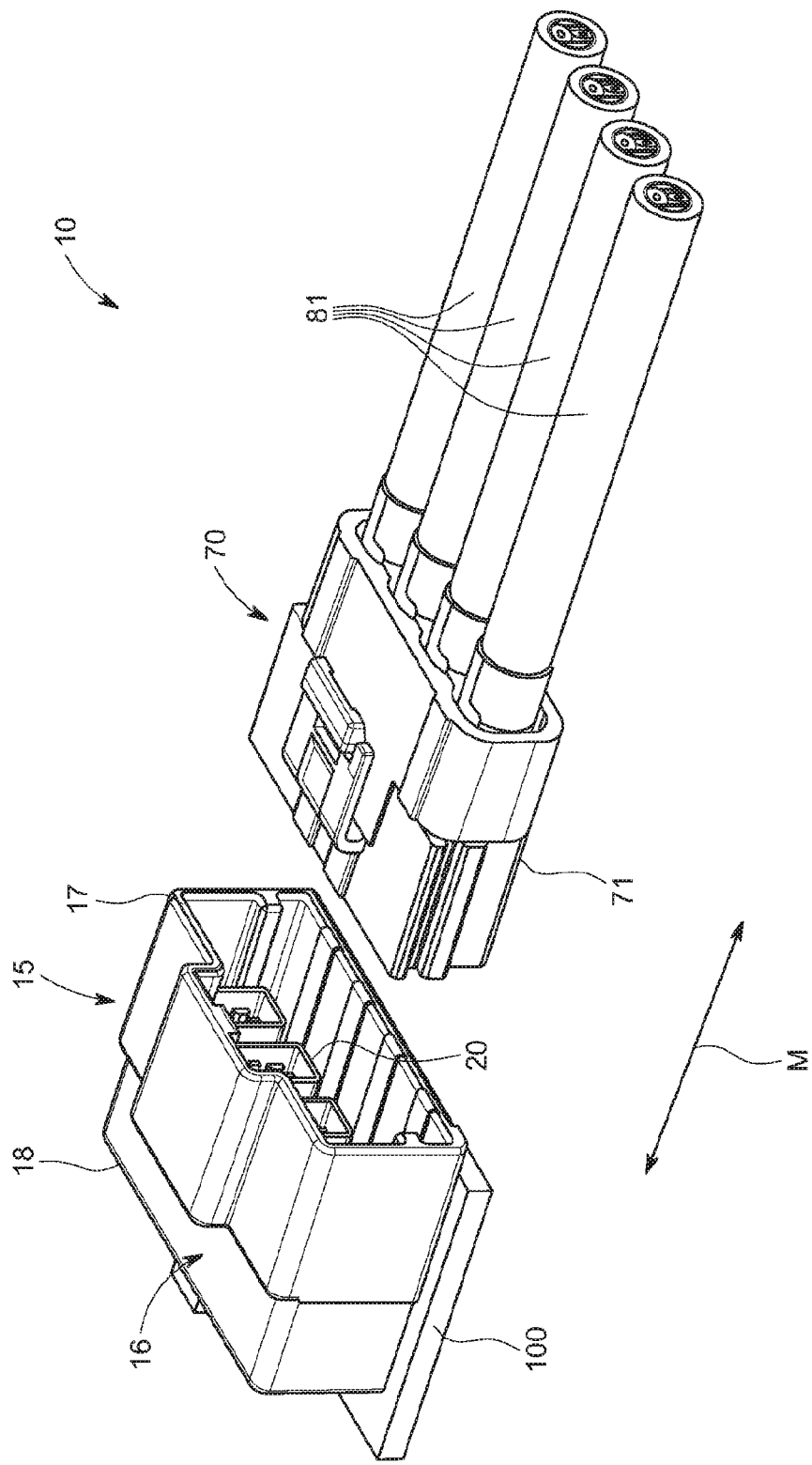
FIG. 2 depicts a perspective view similar to FIG. 1 but with the vehicle harness connector assembly in an unmated condition.
Figure 3:
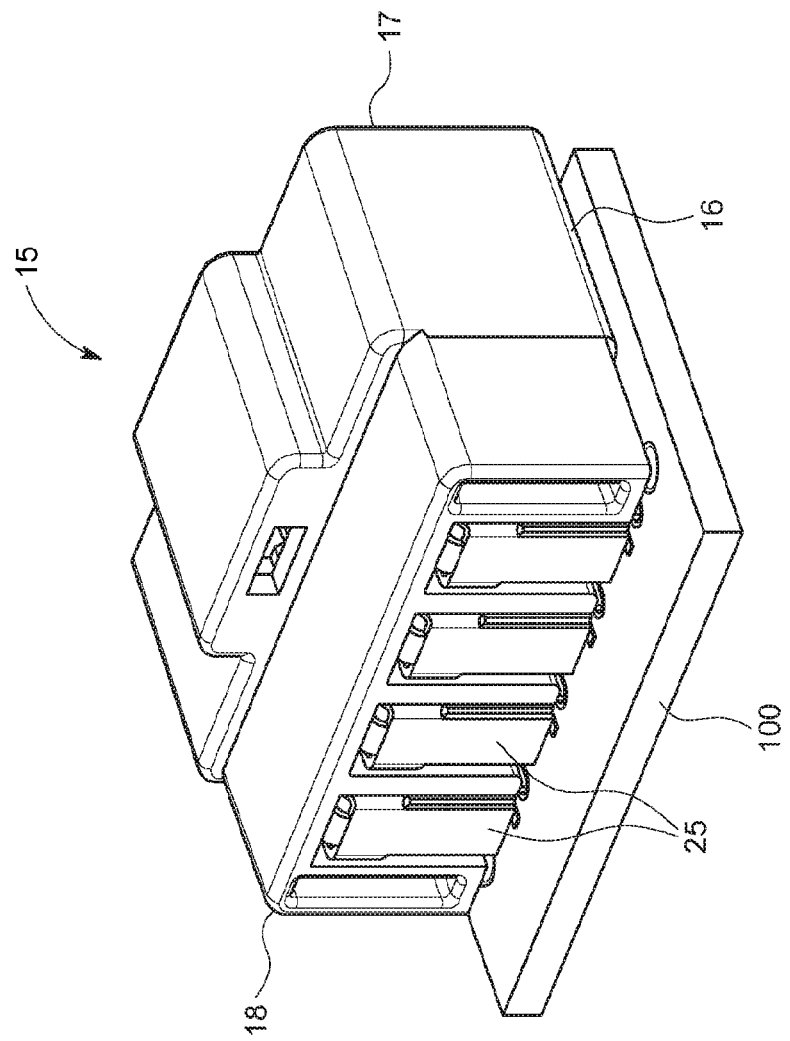
FIG. 3 depicts a perspective view of one of the connectors of the vehicle harness connector assembly of FIG. 1.

As illustrated in the accompanying figures, specifically FIGS. 1-2, a connector system 10 is disclosed for an in-vehicle Ethernet networking system. The connector system 10 includes a first connector assembly 15 having a first insulating housing 16 that retains a plurality of terminal modules 40 in an array and a second connector assembly 70 having a second insulating housing 71 that retains a corresponding plurality of cable plug connectors 90 in a similar array configured to mate with the first connector assembly 15 along a mating axis M. As depicted, an embodiment of the connector system 10 is shown as a right angle arrangement but additional configurations such as a vertical arrangement or wire-to-wire configuration are contemplated.

As illustrated in FIGS. 3-12, the first connector assembly 15 is shown. The first connector includes a housing 16, formed form an insulative material, that is configured to retain a plurality of terminal modules 25. The embodiment depicts four individual terminal modules 25 but any number of modules can be used. The housing 16 is generally rectangular in shape and includes a mating end 17 and an opposite, module mounting end 18. The mating end 17 includes an opening 20 for receiving a corresponding mating housing of a second connector. The mounting end 18 has a plurality of receiving bays 21 formed therein in which the terminal modules 25 are retained. A passage extends between the opening 20 and the receiving bays. Each receiving bay 21 further includes a second downward facing opening 22 that communicates with a circuit board 100 to facilitate mounting each terminal module 25 to the appropriate contact pads and associated traces on the circuit board.

Figure 4:
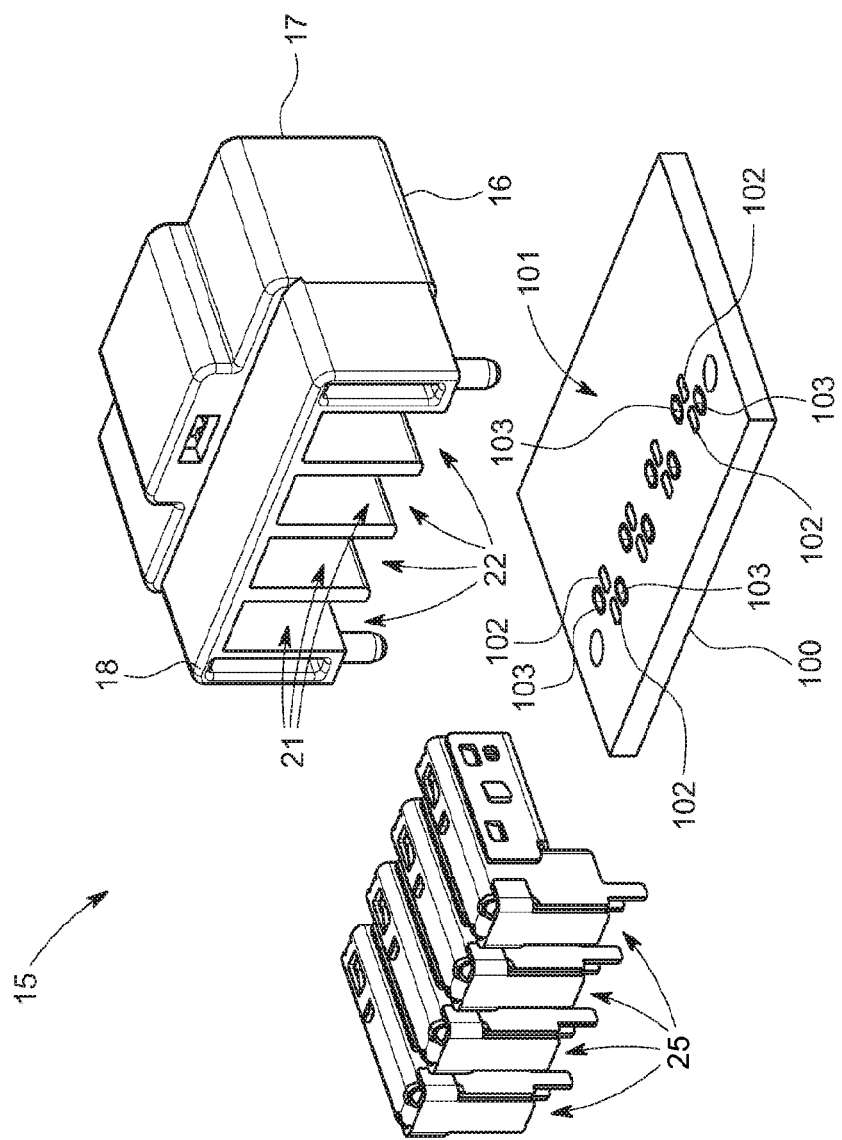
FIG. 4 depicts a partially exploded rear perspective view of the connector of FIG. 3.
Figure 5:
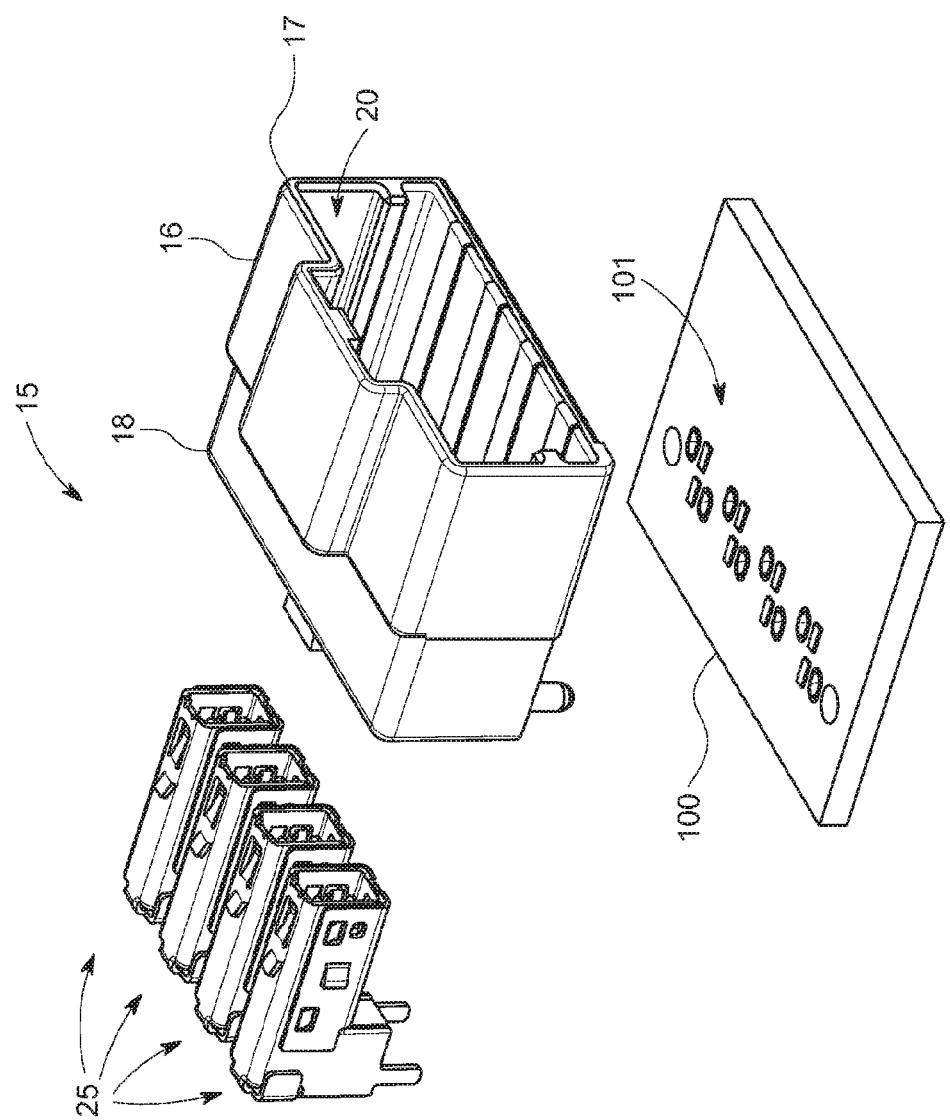
FIG. 5 depicts a partially exploded front perspective view of the connector of FIG. 3.
Figure 6:
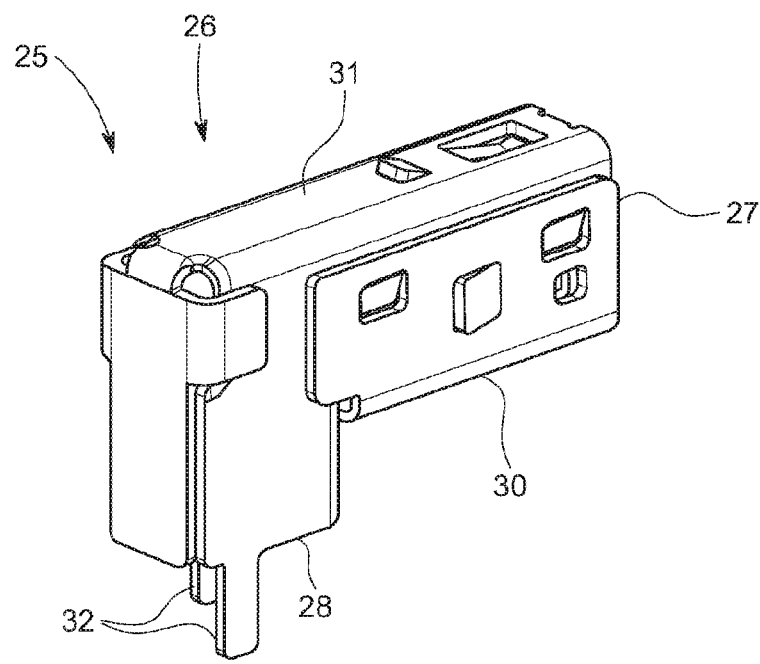
FIG. 6 depicts a rear perspective view of a terminal module for use with the connector of FIG. 3.
Figure 7:
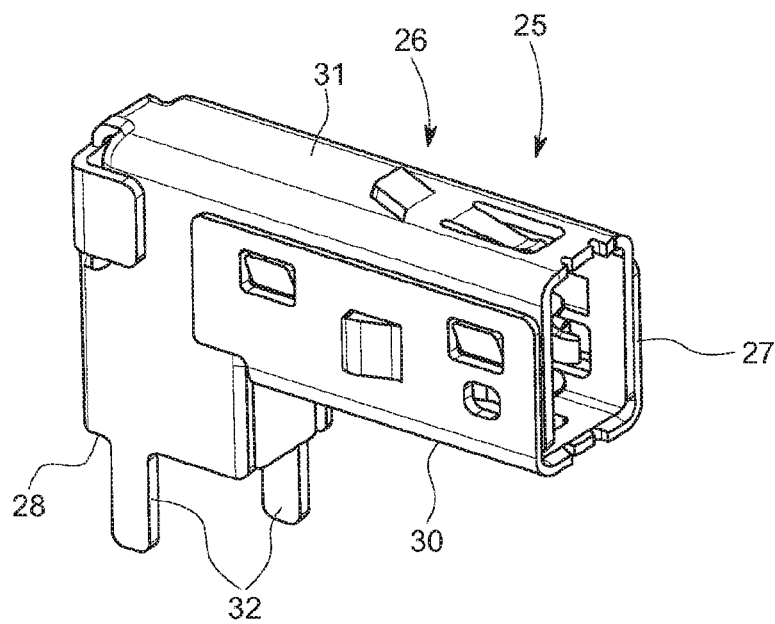
FIG. 7 depicts a front perspective of the terminal module of FIG. 6.

An exemplary printed circuit board layout or footprint 101 is illustrated in FIG. 4. The footprint 101 includes a combination of contact pads 102 and plated through holes 103. The footprint 101 corresponds to the termination structure of the array of modules 25 held within the housing 16 and is arranged along a longitudinal direction normal to the mating axis M. The contact pads 102 engage tails 45, 55 formed from the terminals 37, 38 of each module 25 and are spaced apart and adjacent each other along a line parallel to the mating direction. The plated through holes 103 are configured to receive integrally formed tabs 32 that are formed on the shield 26 of each module 25. The plated through holes 103 are arranged adjacent each contact pad 102 and positioned on alternating sides of each respective pad. The size and geometry of the contact pads and traces can be adjusted to tune the signal integrity in the launch area or the area at which each module 25 is connected to the circuit board 100.

Figure 8:
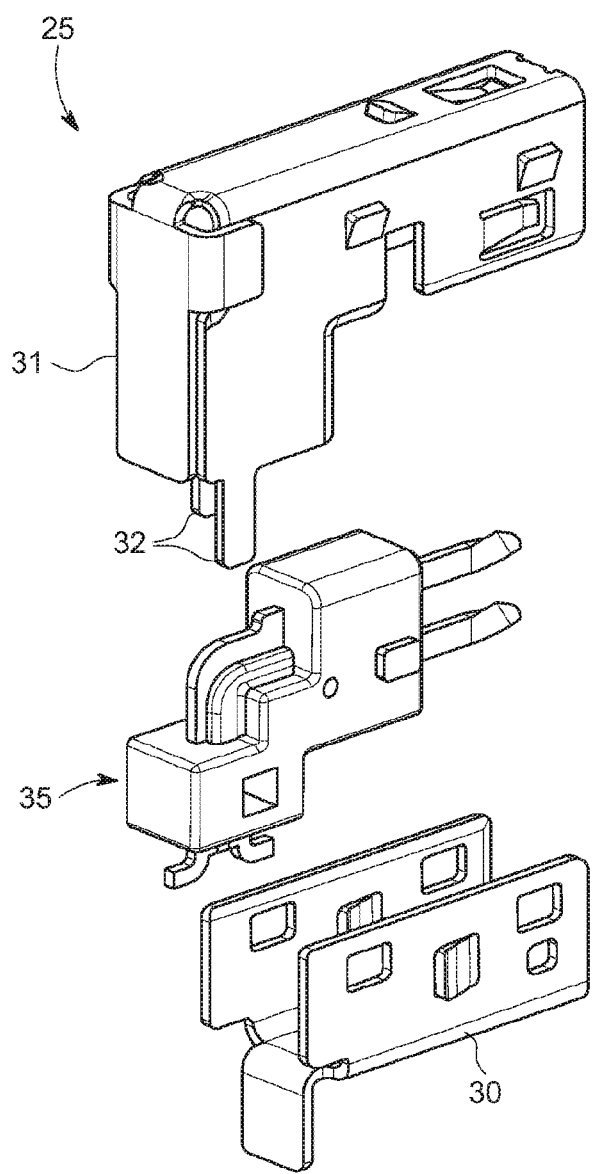
FIG. 8 depicts an exploded rear perspective view of the terminal module of FIG. 6.
Figure 9:
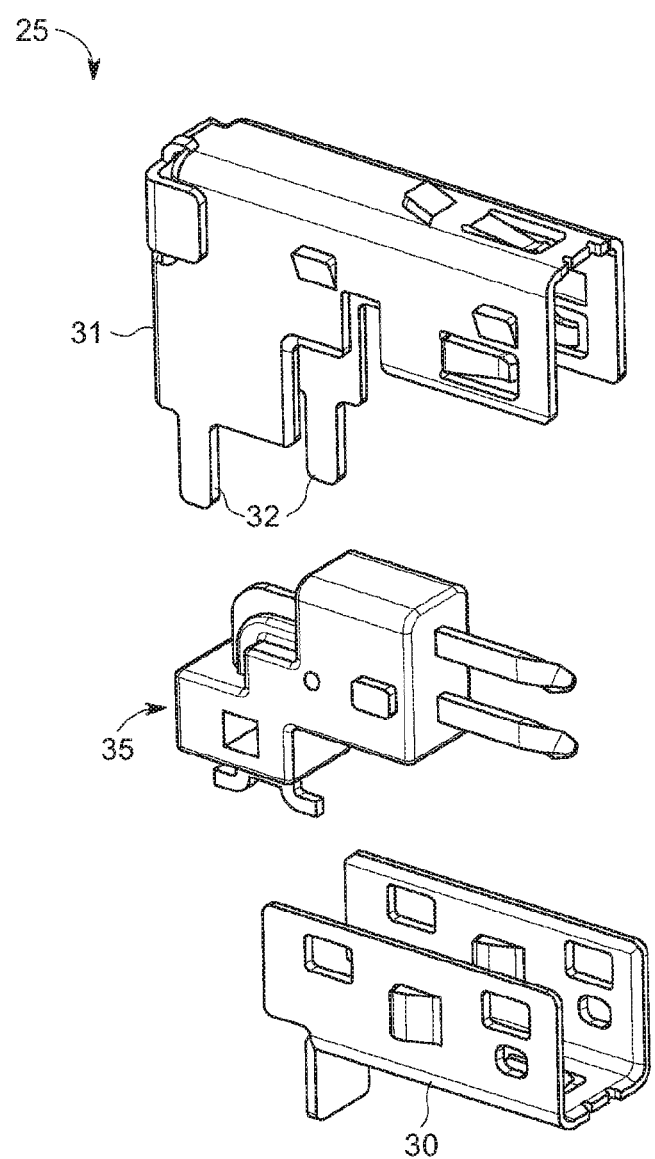
FIG. 9 depicts an exploded front perspective view of the terminal module of FIG. 6

As shown in FIGS. 6-12, details of the terminal modules 25 are illustrated. Terminal module 25 includes a conductive shield 26 disposed about a terminal assembly 35. The shield 26 includes mating end 27 and a board mount end 28. As depicted in FIG. 8, the shield 26 includes a U-shaped base portion 30 and a cover 31 that interlock together to completely enclose the terminal assembly 35 other than at the mating end 27 and board mount end 28. The mating end 27 of the shield 26 is configured to engage a cooperating portion of a mating plug connector 85. The cover 31 can include downwardly extending tails 32 configured to be inserted into and secured within the plated through holes 103 in the circuit board 100. The shield 26 may include structure for retaining the terminal assembly 35 within the shield.

Figure 10:
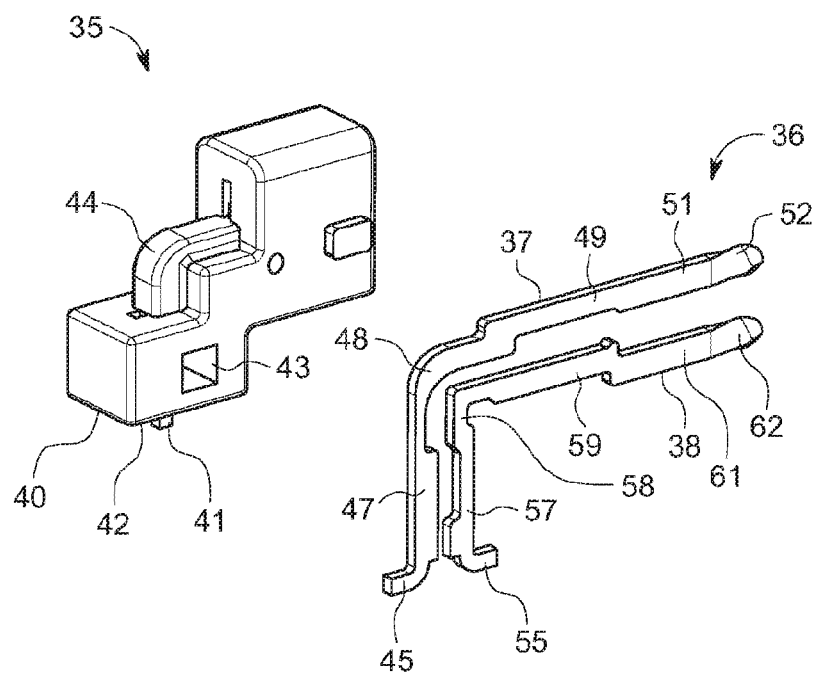
FIG. 10 depicts an exploded rear perspective view of a terminal assembly of the terminal module of FIG. 6.
Figure 11:
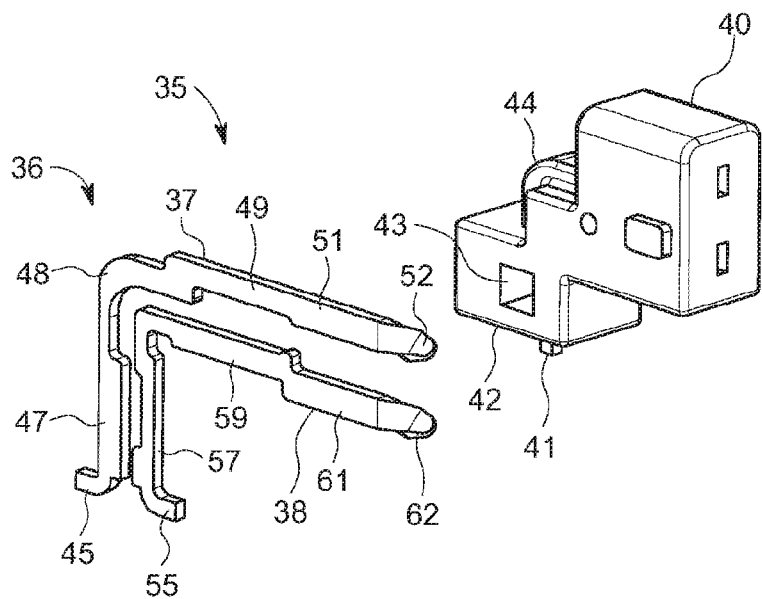
FIG. 11 depicts an exploded front perspective view of the terminal assembly of FIG. 10.
Figure 12:
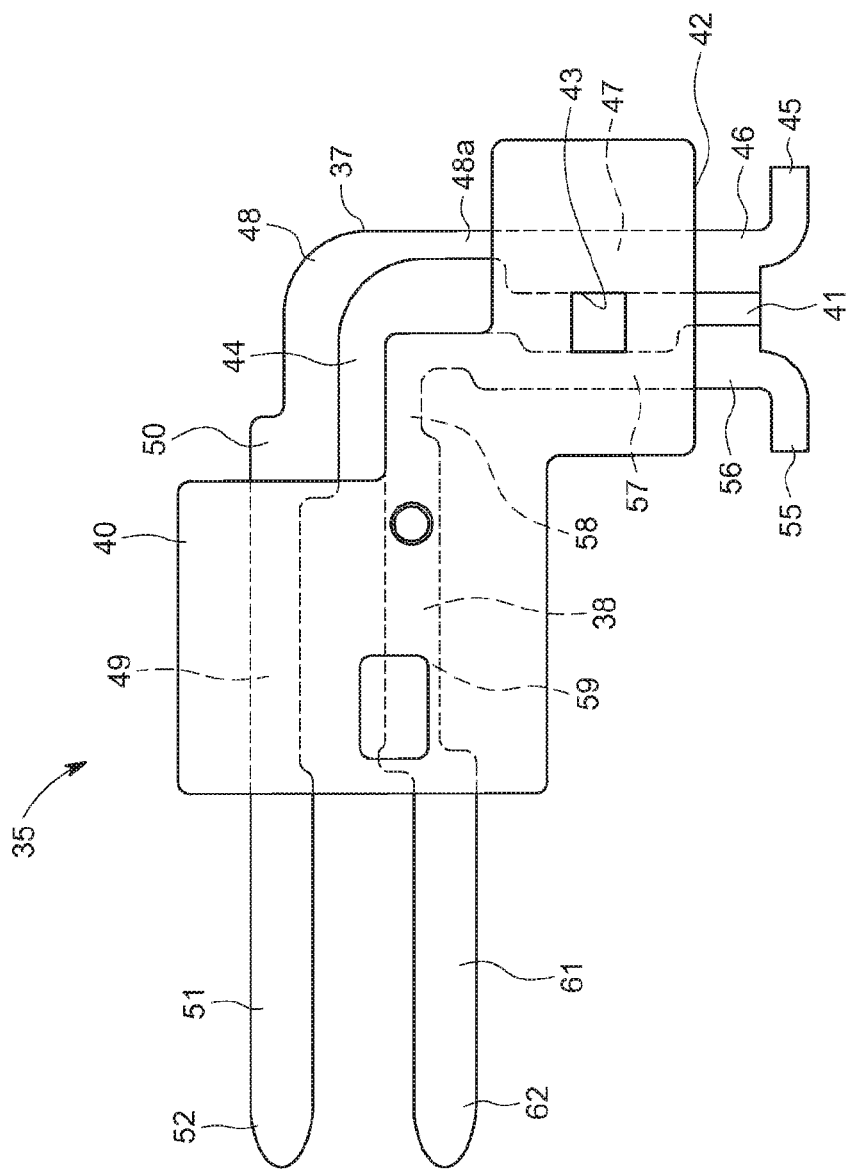
FIG. 12 depicts a side view of the terminal assembly of FIG. 11.

Referring to FIGS. 10-12, the terminal assemblies 35 include a pair 36 of electrically conductive terminals arranged in a vertical fashion and aligned in an edge-to-edge manner. The pair 36 of terminals include an upper terminal 37 and a lower terminal 38 that define an edge coupled differential signal pair. Other terminal configurations are contemplated such as a horizontal arrangement with the pair 36 of terminals being electrically coupled in a broadside or body-to-body manner, or any combination of each.

Each terminal assembly 35 further includes an insulative housing 40 disposed around each pair 36 of electrically conductive terminals. In an embodiment, the insulative housing 40 may be insert molded around the terminals. To do so, a lead frame (not shown) may be formed on which the terminals are stamped and formed and held together by a carrier (not shown). A housing 40 may then be molded over or around portions of the terminals to form the terminal assembly 35. In another embodiment, the housing may be separately formed and the terminals positioned therein.

As depicted in FIGS. 10-12, the terminals 37, 38 of each pair 36 include specific spacing and geometry, including but not limited to varying cross-sections, cut-outs, radii and spacing gaps. Each geometrical configuration and position may be specifically arranged to optimize the signal integrity ("SI") performance of each differential signal pair. Examples of optimized SI tuning includes adjusting the spacing between the contacting portions of the terminals to increase impedance. Notches may be formed along the terminals to match impedance and create a balance signal transmission. Further, the housing 40 may also be specifically formed to tune the SI performance of each terminal module 25. For example, the housing 40 may include cross holes and apertures that interact with the specific geometry of each terminal or terminal pair to effect the optimized SI performance. Accordingly, portions of each terminal may be exposed to air or totally enclosed by insulative material of the housing 40 with additional adjustments to material thickness by either increasing or decreasing the material in specific areas or regions. The dielectric constants of the insulative housing 40 and air are strategically employed to further enhance the SI performance.

In the depicted embodiment, the connector system 100 has been configured to have an impedance of 100 ohms along its entire length. Although the impedance at any particular location along the electrical path may not be 100 ohms, the system is configured to optimize performance about the 100 ohm goal. Accordingly, as discussed above the shield 26, terminals 37, 38 and housing 40 are formed to optimize SI performance together with the mechanical performance and manufacturability.

Referring to FIGS. 10-12, each of the terminals 37, 38 includes sequentially a tail section, a vertical section, an angled transition section, a horizontal section, and a mating interface section. Each of the terminals 37, 38 includes a surface mount tail 45, 55, respectively, configured to be mechanically and electrically connected to one of the contact pads 102 on the circuit board 100 such as by soldering. The surface mount tails 45, 55 are identically configured but extend in opposite directions from their respective horizontal sections.

The amount of conductive material from the surface mount tails 45, 55, the contact pads, and the solder decreases the impedance, while the spacing of the contact pads 102 in the depicted embodiment of the circuit board 100 increase the impedance in that area. Further, the shield 26 may not extend all of the way down to the circuit board 100 to facilitate the soldering of the tails 45, 55 to the contact pads 102. The lack of shielding combined with the geometry of the contact pads 102 increases the impedance at the circuit board termination area. The spacing of the contact pads 102 and the lack of shielding compensate to some extent for the clustering of conductive materials such as the contact pads, the surface mount tails 45, 55, and the solder material. In addition, the housing 40 may be further optimized to 100 ohms by providing a downward projection 41 extending between the lower portions 46, 56 of the horizontal sections of the terminals 37, 38, respectively. Further, the projection 41 also ensures that the terminals 37, 38 do not contact each other in the area adjacent the tails 45, 46.

The projection 41 operates to decrease the impedance between the lower portions 46, 56 of the vertical sections 47, 57 of the terminals 37, 38 to compensate for the increased impedance at the interconnection between the surface mount tails 45, 55 and the contact pads 102. In some embodiments, a minimum spacing may exist between the lower surface 42 of the housing 40 and the contact pads 102 in order to facilitate the soldering process. By only including a projection 41 extending from the lower surface 42 between the terminals 37, 38, the impact of the housing 40 on the soldering process may be minimized while improving the electrical performance adjacent the circuit board termination area.

The remaining vertical portion 47 of the upper terminal 37 has a constant width that is the same width as that of the lower portion 46. However, the remaining vertical portion 57 of the lower terminal 38 has a stepped width that is narrower than the lower vertical portion 56. Both of the vertical portions 47, 57 are enclosed within the housing 40. An aperture 43 is disposed in the housing 40 between the vertical portions 47, 57 to assist with securing the terminals 37, 38 within a mold (not shown) during the molding process. The aperture 43 along the vertical portions 47, 57 increases the impedance along the vertical portions. Accordingly, by providing a portion of the insulative housing 40 above and below the aperture 43 but between the vertical portions 47, 57, a decrease in impedance is provided on both sides of the aperture along the electrical path to electrically compensate for the aperture 43 in the housing.

The angled transition sections 48, 58 of the terminals 37, 38 function to interconnect the vertical portions 47, 57 with the horizontal sections 49, 59. As a result of the configuration of the angled section transition sections 48, 58, the electrical path of the angled section 48 of the upper terminal 37 is longer than the electrical path of the angled section 58 of the lower terminal 37. In order to reduce signal skew and compensate for the difference in path lengths between the angled section 48 and the angled section 58, a curved portion 44 of the housing 40 extends around the angled section 58 of the lower terminal while the angled section 48 of the upper terminal 38 is surrounded by air. Due to the lower dielectric constant of air as compared to that of the insulative material of the portion 44, signals traveling along the angled section 48 of the upper terminal 38 will travel faster than those traveling along the angled section 58 of the lower terminal 37, thus compensating for the difference in path length.

In addition, since the portion 48a of the transition section 48 adjacent the vertical portion 47 of the upper terminal 38 is surrounded by air, the impedance of the terminal pair 36 increases as it exits the housing 40. Accordingly, the portion 48a of the transition section 48 adjacent the vertical portion 47 has a reduced width to achieve a desired distance between the transition section 48 of the upper terminal 37 and the transition section 58 of the lower terminal 38 to control the impedance of the pair 36 of terminals.

In an embodiment, the portion 50 of the transition section 48 adjacent the horizontal portion 49 of the upper terminal 37 may be wider than the other portions of the transition section as well as the horizontal section. This change in width may be provided to compensate for the change in impedance as the signal travels from the transition section 48 in air to the horizontal section 49 within the insulative housing 40.

The distance between the horizontal portion 49 of the upper terminal 37 and the horizontal portion 59 of the lower terminal 38 is set based upon the dielectric properties of the insulative housing 40 to provide the desired 100 ohm impedance. The distance between the mating interface sections 51, 61 of the terminals 37, 38 is set to provide a desired distance or pitch between terminals to optimize mating and electrical performance. In the depicted embodiment, the mating ends 52, 62 of the terminals 37, 38 are configured as male pins of a low force helix "LFH" mating system. Terminals 37, 38 having other configurations are contemplated.

Figure 13:
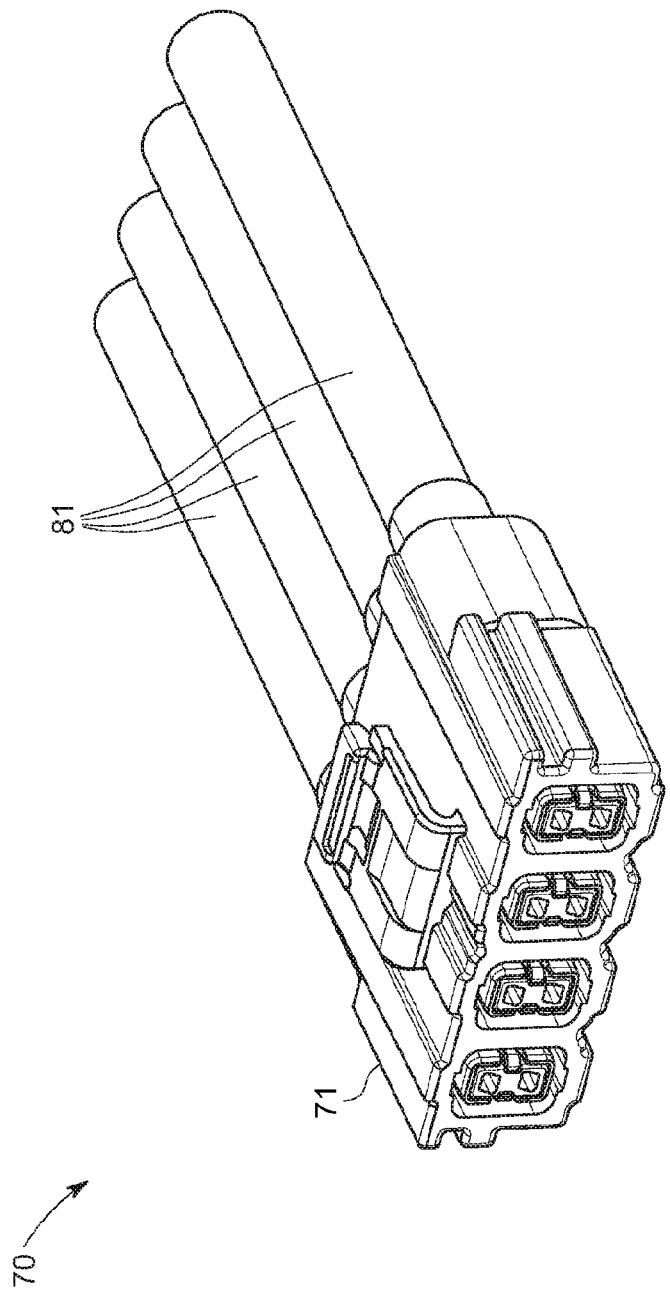
FIG. 13 is a front perspective view of a second connector of the vehicle harness connector assembly of FIG. 1.
Figure 14:
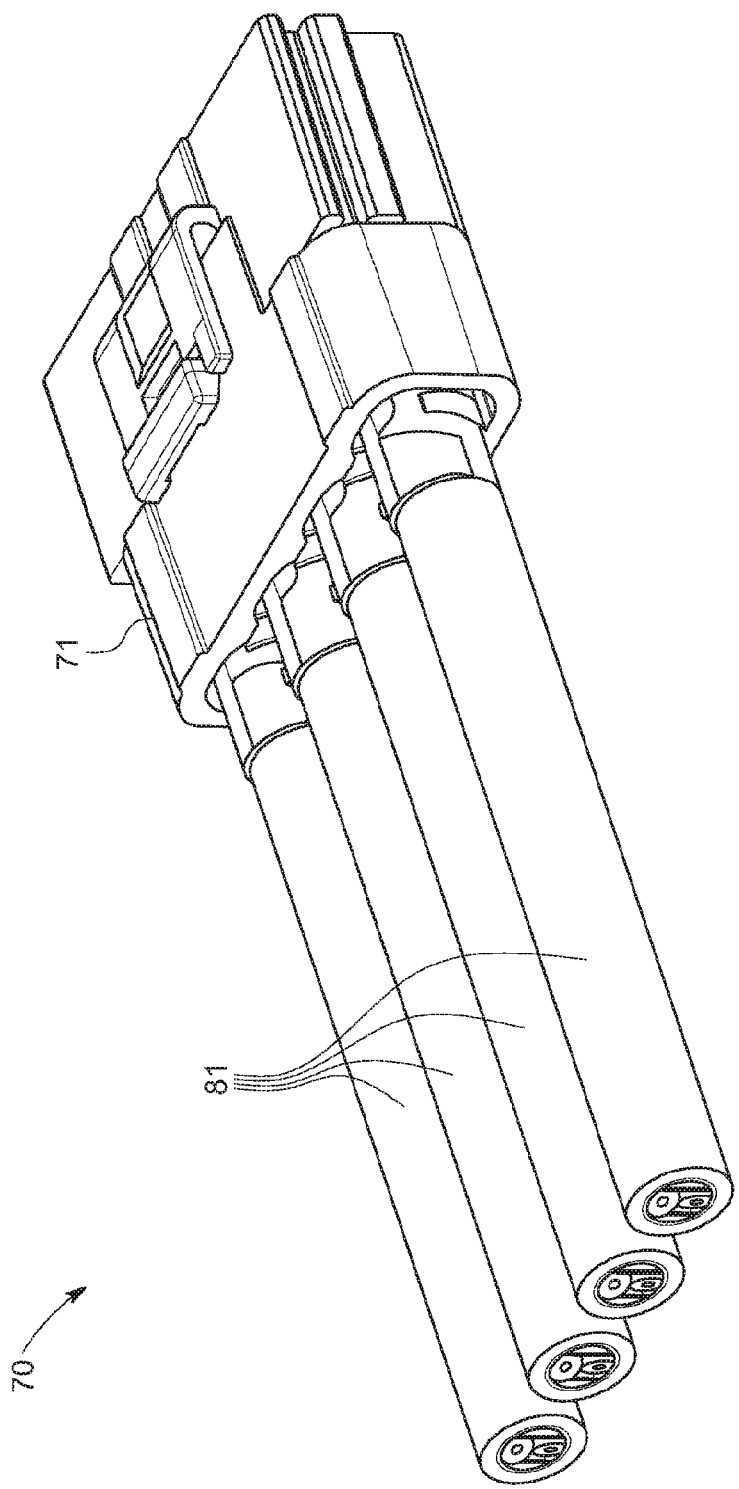
FIG. 14 is a rear perspective view of the connector of FIG. 13.
Figure 15:
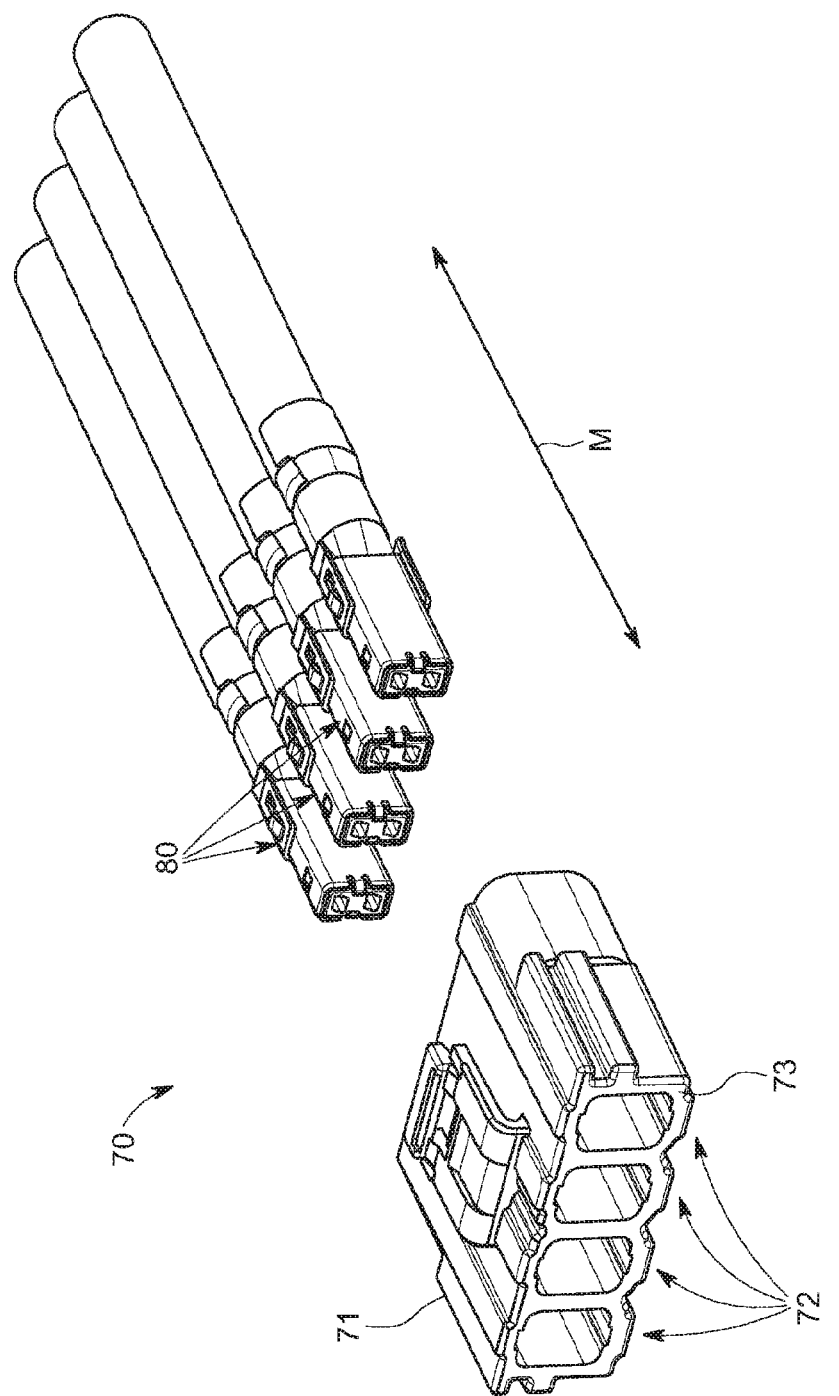
FIG. 15 is a partially exploded perspective view of the connector of FIG. 13.
Figure 16:
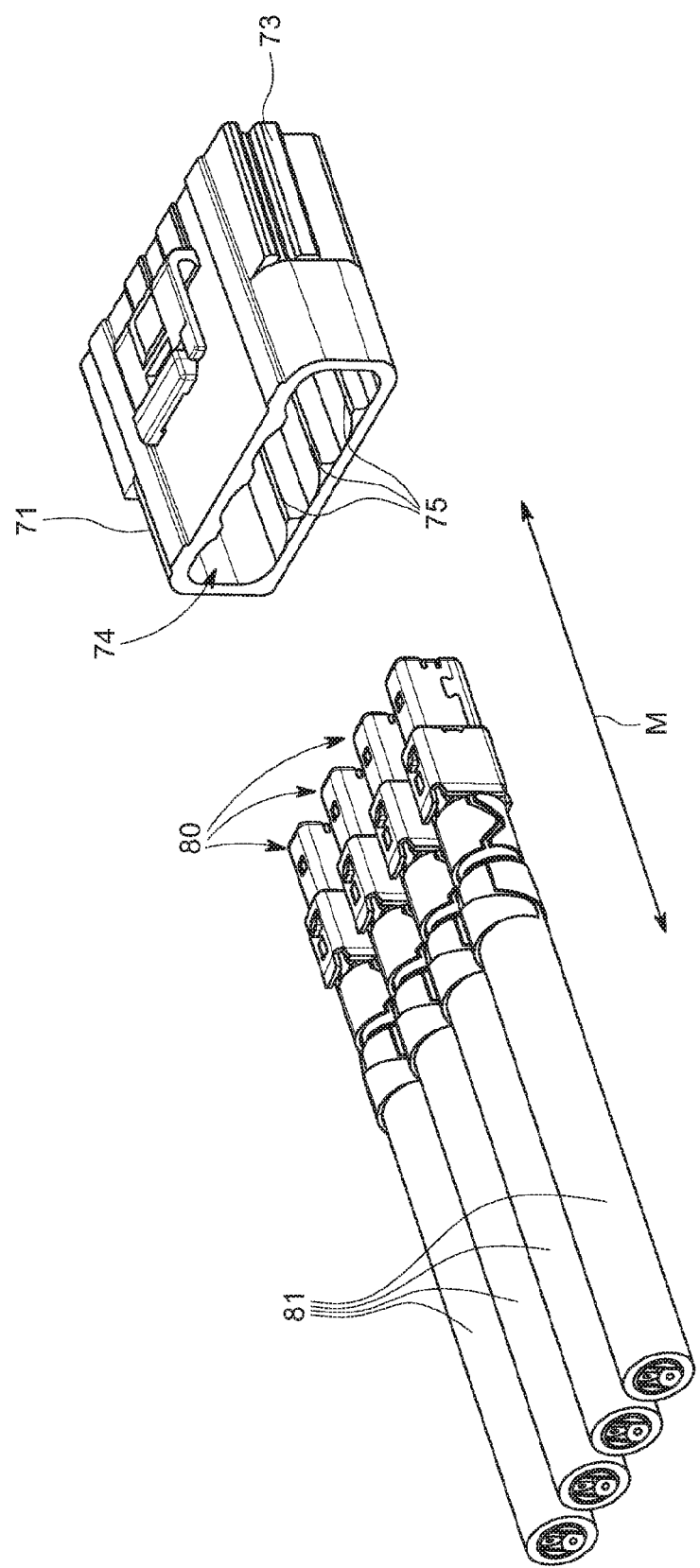
FIG. 16 is a partially exploded perspective view of the connector of FIG. 14.
Figure 17:
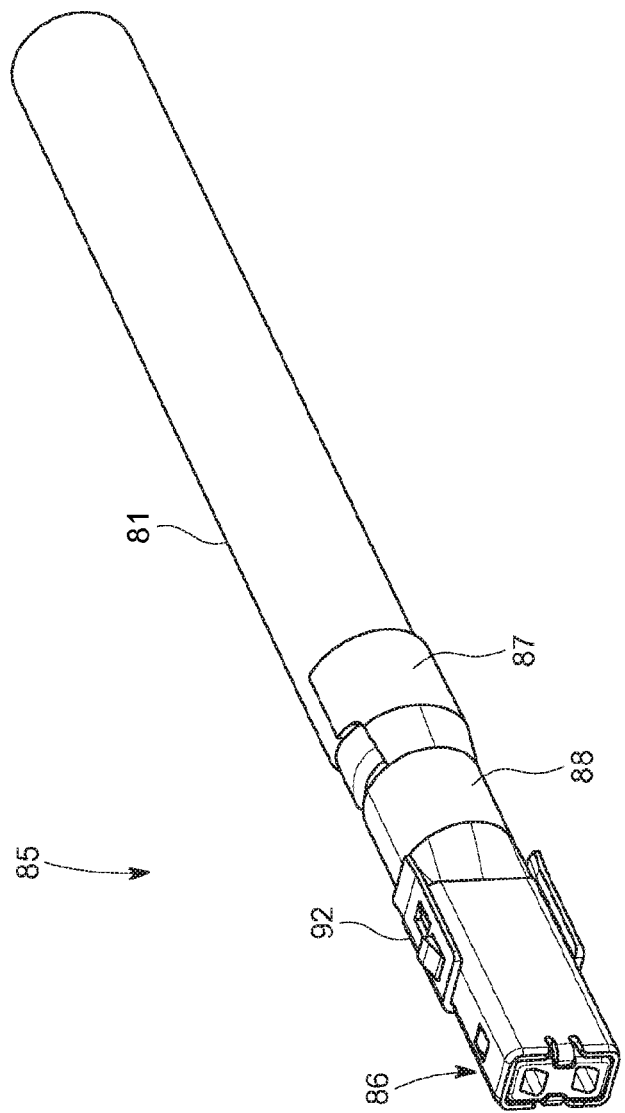
FIG. 17 is a front perspective view of a cable connector assembly for use with the connector of FIG. 13.
Figure 18:
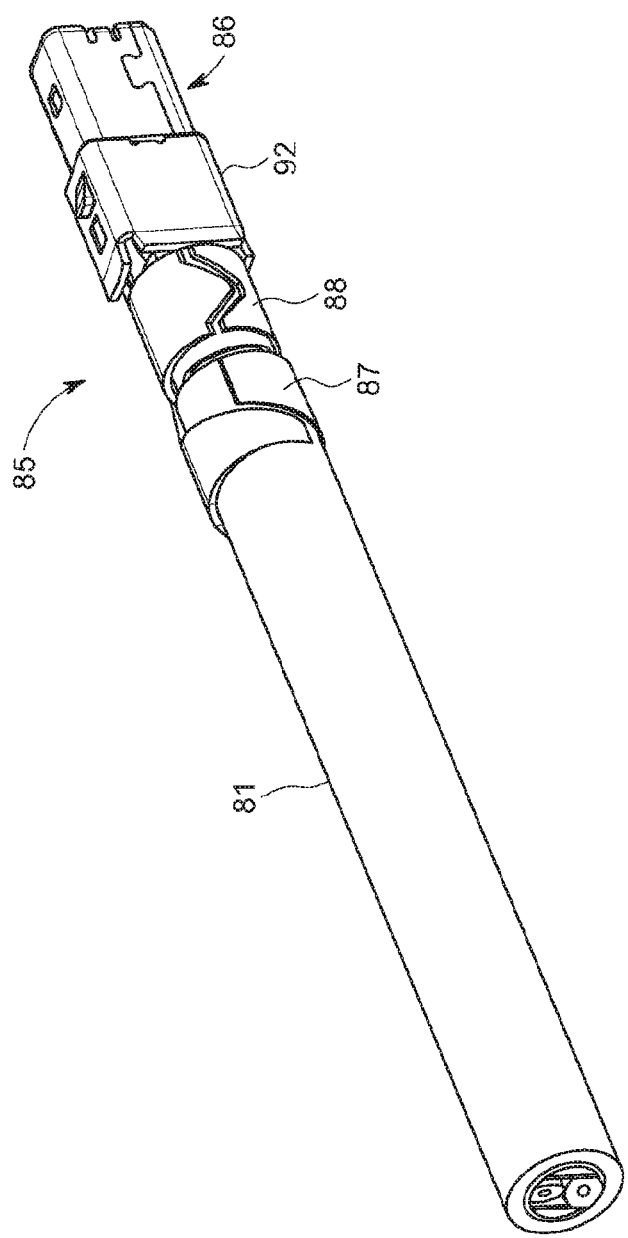
FIG. 18 is a rear perspective view of the cable connector assembly of FIG. 17
Figure 19:
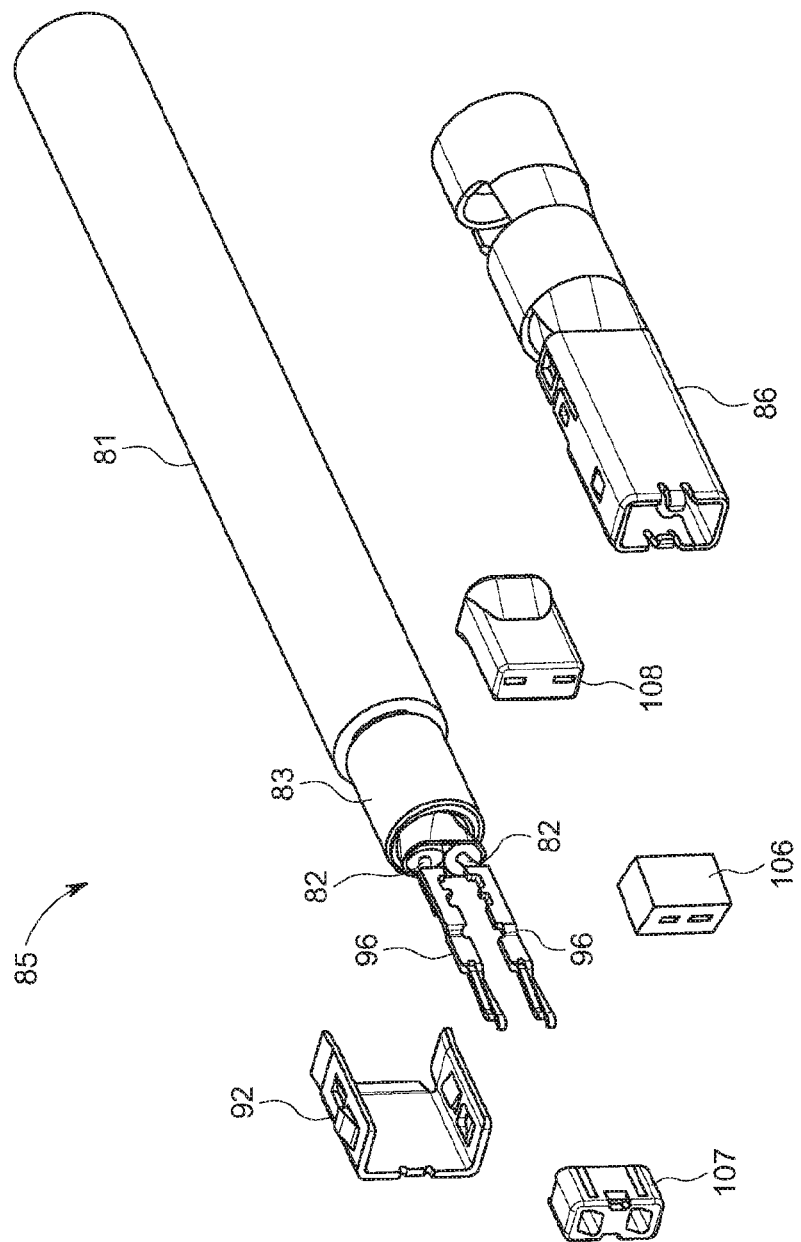
FIG. 19 is a partially exploded front perspective of the cable connector assembly of FIG. 17.
Figure 20:
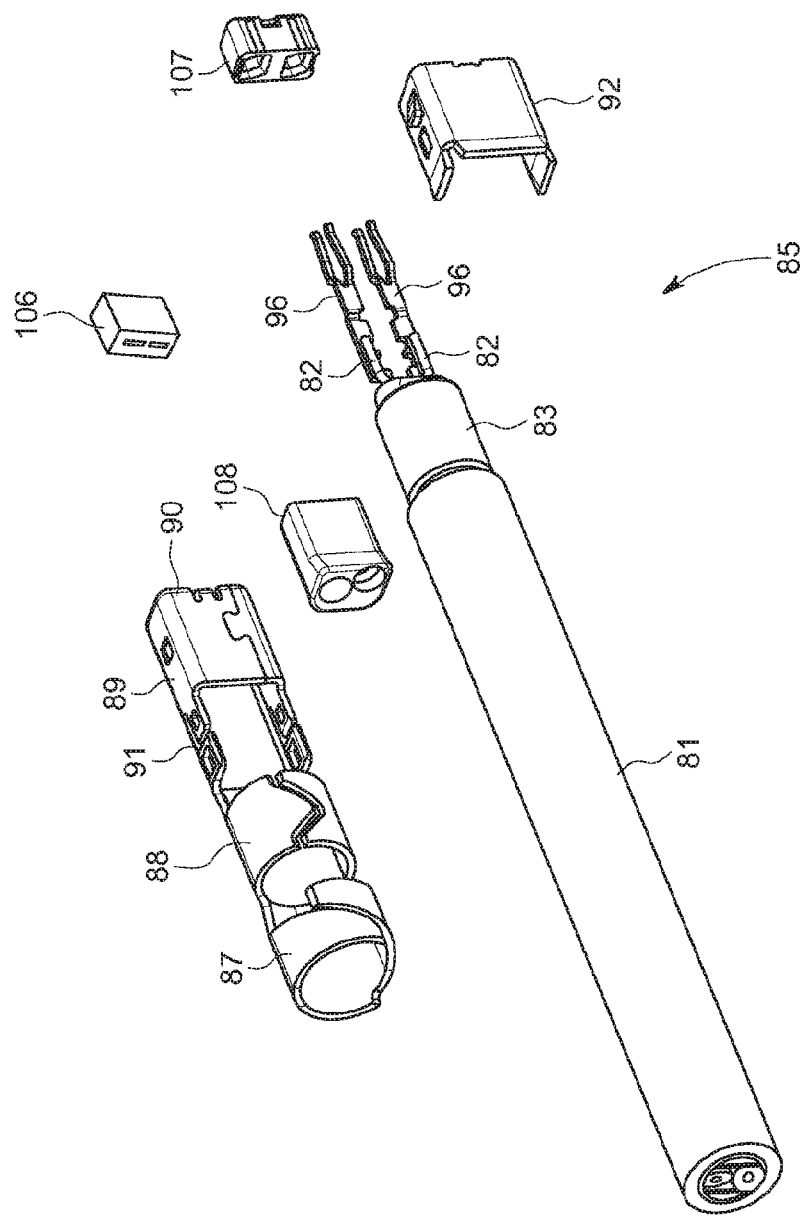
FIG. 20 is a partially exploded rear perspective view of the cable connector assembly of FIG. 18.

As shown in FIGS. 13-14, the second connector assembly 70 is illustrated. The second connector assembly 70 includes an insulative housing 71 that is configured to retain a plurality of individual cable plug connector assemblies 80. The housing 71 is configured to engage the opening 20 at the mating end 17 of the first housing 16 of the first connector assembly 15. As best shown in FIGS. 15-16, the housing 17 includes a plurality of openings 72 in a mating face 73 corresponding to the number of terminal modules 25 in the first connector assembly 15 and an insertion opening 74 opposite the openings of the mating face. Individual mounting areas are formed within the insertion opening 74 by ridges 75 and are configured to receive each of the plug connector assemblies 80 therein along the mating axis M.

As illustrated in FIGS. 17-21, a plug connector assembly 80 of the second connector assembly 70 is shown. Each plug connector assembly 80 includes a cable 81 and a cable connector assembly 85. The cable 81 has a pair of signal conductors 82 and an integral shielding layer 83 such as a shielded twisted pair cable or twin-ax cable.

The cable connector assembly 85 includes a conductive shield 86 disposed about a terminal module 95. The shield 86 is generally elongated and includes a first crimp portion 87 configured to be crimped around a portion of the cable 81 and a second crimp portion 88 configured to be crimped around to mechanically and electrically connect the shield to the shielding layer 83 of the cable. A connector portion 89 of the shield 86 has a generally rectangular configuration with a mating end 90 opposite the crimp portions 87, 88. The connector portion 89 may include a U-shaped first portion 91 configured to engage a cooperating U-shaped second section 92 to fully enclose the terminal module 95 (FIG. 21) within the shield 86.

The terminal module 95 includes a pair of electrically conductive terminals 96 configured in an edge-to-edge relationship and arranged in a vertical manner to mate with the terminals 37, 38 of the first connector assembly 15. The terminals 96 (other than their mating interface sections 105) are identically configured except that they are a mirror image about a centerline between the two terminals. In other embodiments having a different mating interface, the first and second terminals may be symmetrically configured along their entire length. The terminals 96 are configured to define an edge coupled differential signal pair in the same manner as the terminals 37, 38 of the first connector assembly 15.

The terminal module 95 further includes an insulative body housing component 106 disposed about each pair 97 of terminals 96. In an embodiment, the body housing component 106 may be insert molded around the terminals 96 in a manner similar to that described above with respect to the terminals 37, 38. In addition, a separate mating housing component 107 is disposed within and supported by the shield 86 in a manner spaced from the body housing component and adjacent the mating end 90 of the terminals. Further, the terminals 37, 38 and the mating housing component 107 are configured so that the mating ends of the terminals 96 are disposed in and spaced from the mating housing component. More specifically, the mating housing component 107 has openings in the end to permit deflection of the mating ends 105 without contacting the mating housing component.

As with the terminals 37, 38 of the first connector assembly 15, the terminals 96 of the second connector assembly 70 include specific spacing and geometry and interact with the housing components 106, 107 and the shield 86 to optimize SI performance of each differential signal pair. The terminals 96 are also configured to maintain the 100 ohm impedance of the entire connector system 10. In embodiments, it may be desirable to minimize the size of the housing components 106, 107 in the mating direction to reduce the impact of housing components and the mating interface on reaching the 100 ohm target. More specifically, by providing the gap or space 109 (FIG. 21) between the body housing component 106 and the mating housing component 107, the impedance along the gap 109 is increased to compensate for the decreases in capacitance due to the housing components and the mating interface.

Figure 21:
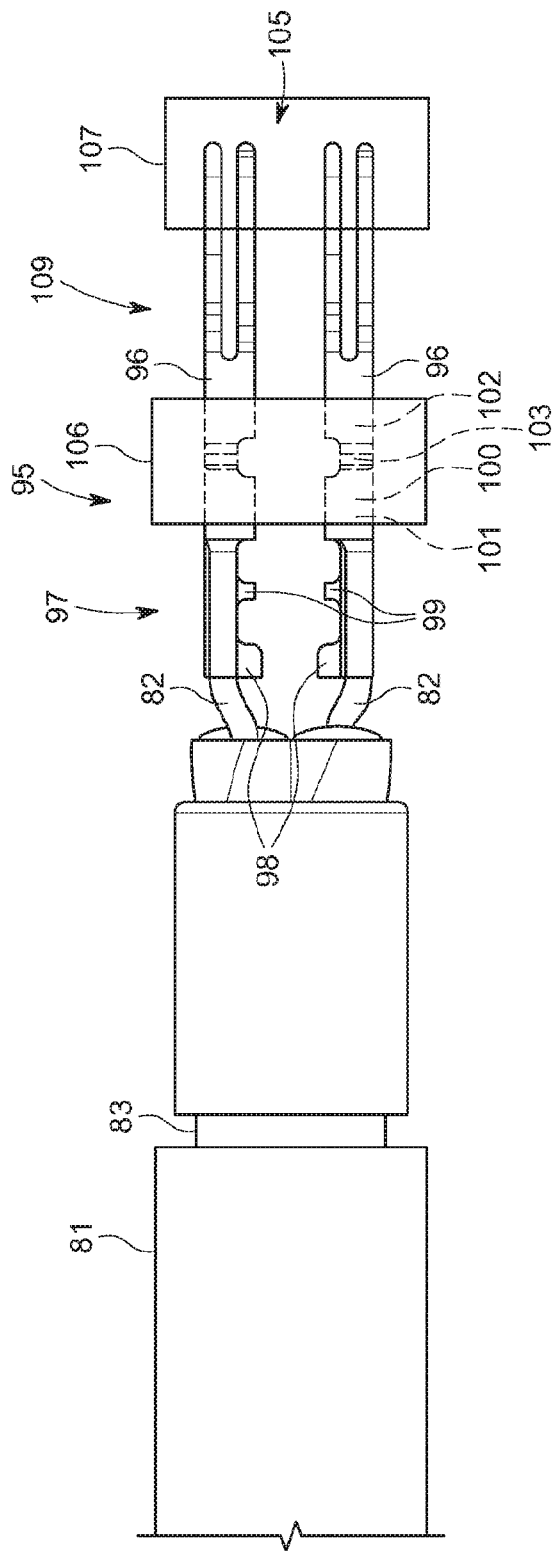
FIG. 21 is a top plan view of an assembled cable and terminal module of the cable connector assembly of FIG. 17.

Referring to FIG. 21, the terminals 96 include sequentially a termination section 97, a body section 100, and a mating interface section 105. The termination section 97 is configured to be soldered or otherwise mechanically and electrically connected to the signal conductors 82 of the cable 81. The termination section 97 includes a first enlarged portion or projection 98 at the first end of the terminal 96 opposite the mating interface section and a second enlarged portion or projection 99 spaced from the first projection 98. In an embodiment, the first projection 98 may be larger than the second projection 99.

The first projection 98 is configured to reduce the impedance at the first end of the terminal 96. This is desirable because the length of the signal conductor 82 immediately adjacent the first end of the terminal 96 is unshielded as it exits the cable 81 and therefore has relatively high impedance. Accordingly, by providing the relatively large first projection 98 with a relatively low impedance, the first projection will compensate or offset the relatively high impedance along the unshielded portion of the signal conductors 82.

The second projection 99 may be provided to improve the strength of the solder connection between the signal conductor 82 and the termination section 97 of the terminal 96.

The body section 100 is depicted as having two spaced apart planar sections 101, 102 with a bend section 103 therebetween. The bend section 103 may be narrower than the planar sections 101, 102 to control the impedance as a result of the body housing component 106 molded over the body section 100.

The mating interface section 105 of the terminals 96 is configured as a receptacle of a low force helix mating system in order to mate with the terminals 37, 38 of the first connector assembly 15.

During assembly of the plug portion of the plug connector, the terminals 96 are soldered to the signal conductors 82 of the cable 81. A dispensed or molded insulator 108 is subsequently formed around the terminated portions of the signal conductors 82 and the termination section 97 of the terminals 96. The terminated cable 81 and terminal module 95 may be inserted into the shield 86 and the crimped portions 87, 88 crimped to the cable 81. The second section 92 may be secured to the first portion 91 of the shield 86 to fully enclose the terminal module 95.

In an embodiment, the mating housing component 107 may be inserted into the mating end of the shield 86 prior to positioning the terminated terminal module 95 therein. In another embodiment, the mating housing component 107 may be inserted after assembling the shield 86 and terminal module 95.

In operation, the fully assembled first connector 15 is secured to a printed circuit board 100 with the appropriate connections between the terminals of each module and shield maintaining proper electrical connection to the corresponding traces on the printed circuit board. The second connector 70 is mated to the first connector 15 by inserting the mating portion of the second housing into the opening formed in the first housing. Upon further insertion, the shields of the terminal modules and shields of the plug portions engage each other and, upon complete insertion, the terminals of the terminal modules and terminals of the plug portions respectively engage.

Figure 22:
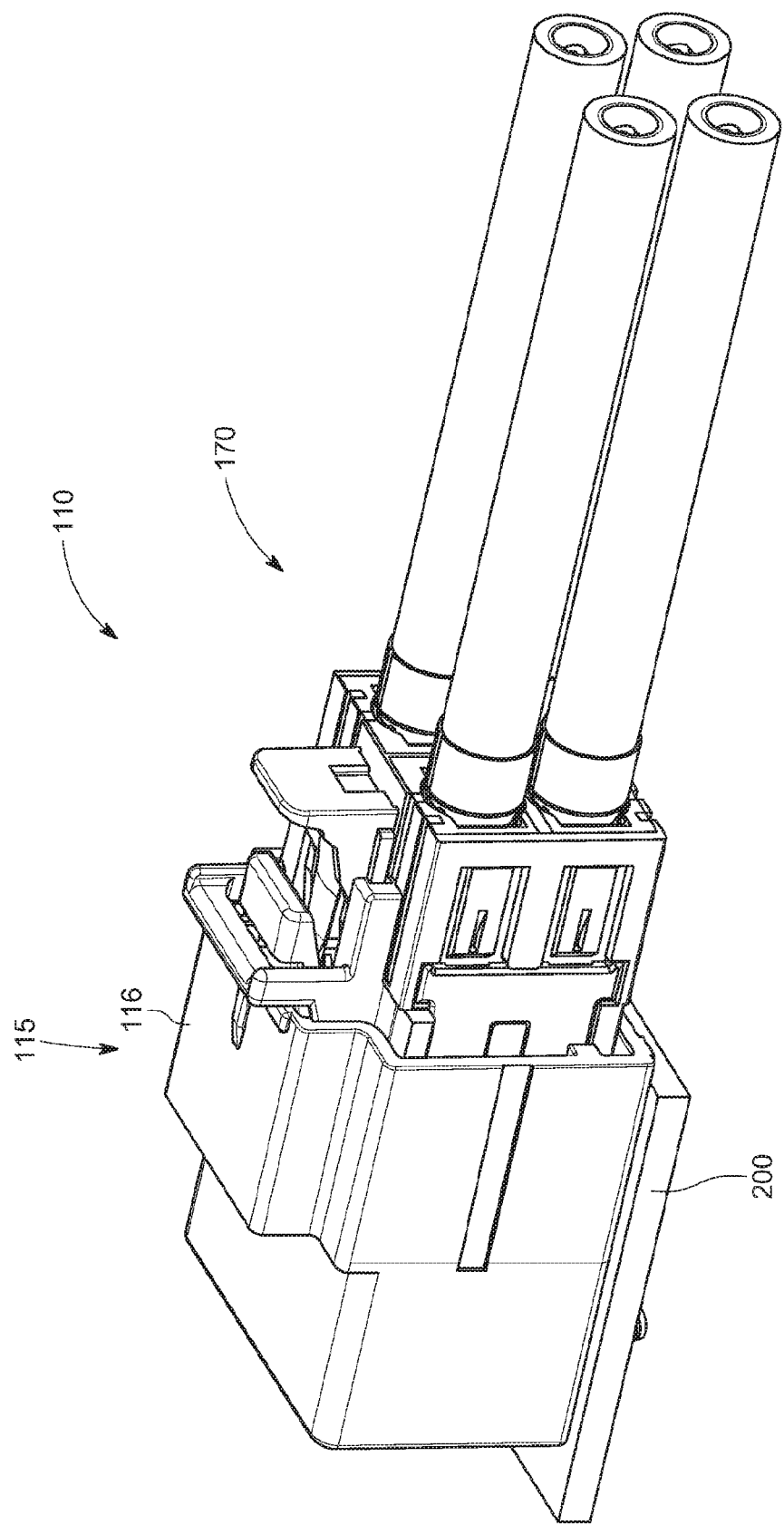
FIG. 22 depicts a front perspective view of a vehicle harness connector assembly according to a second embodiment of the present disclosure.
Figure 23:
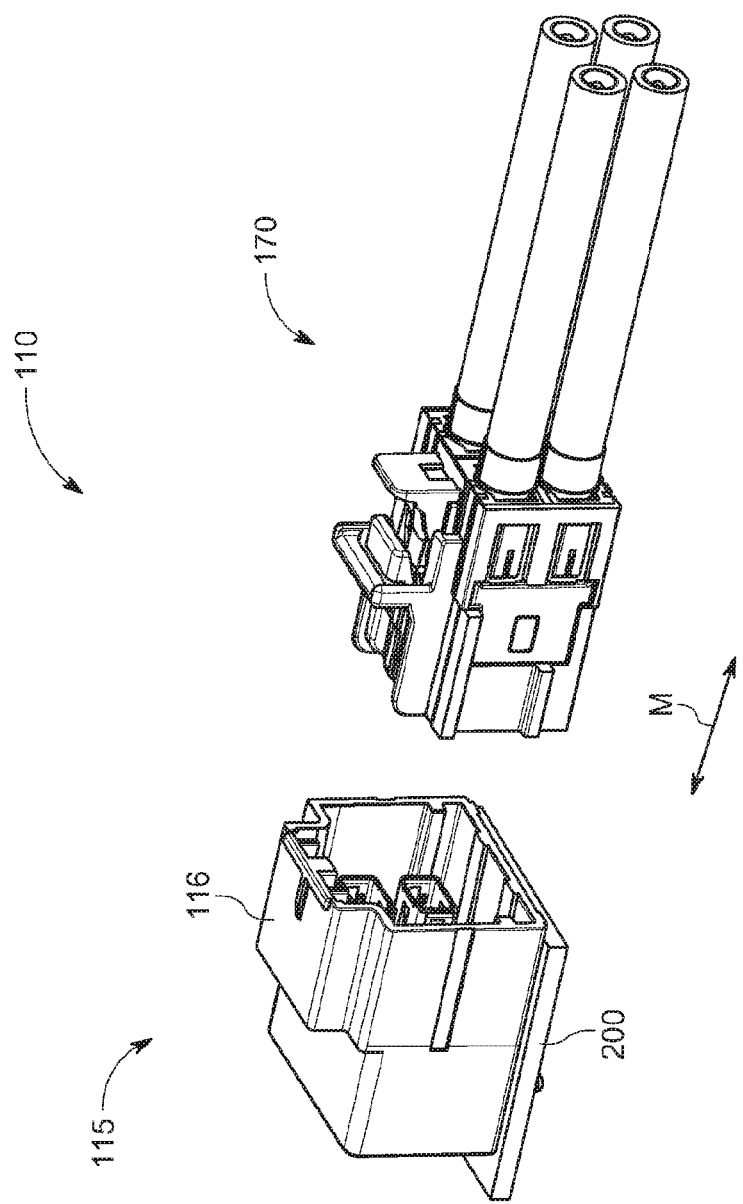
FIG. 23 depicts a perspective view similar to FIG. 22 but with the vehicle harness connector assembly in an unmated condition.
Figure 24:
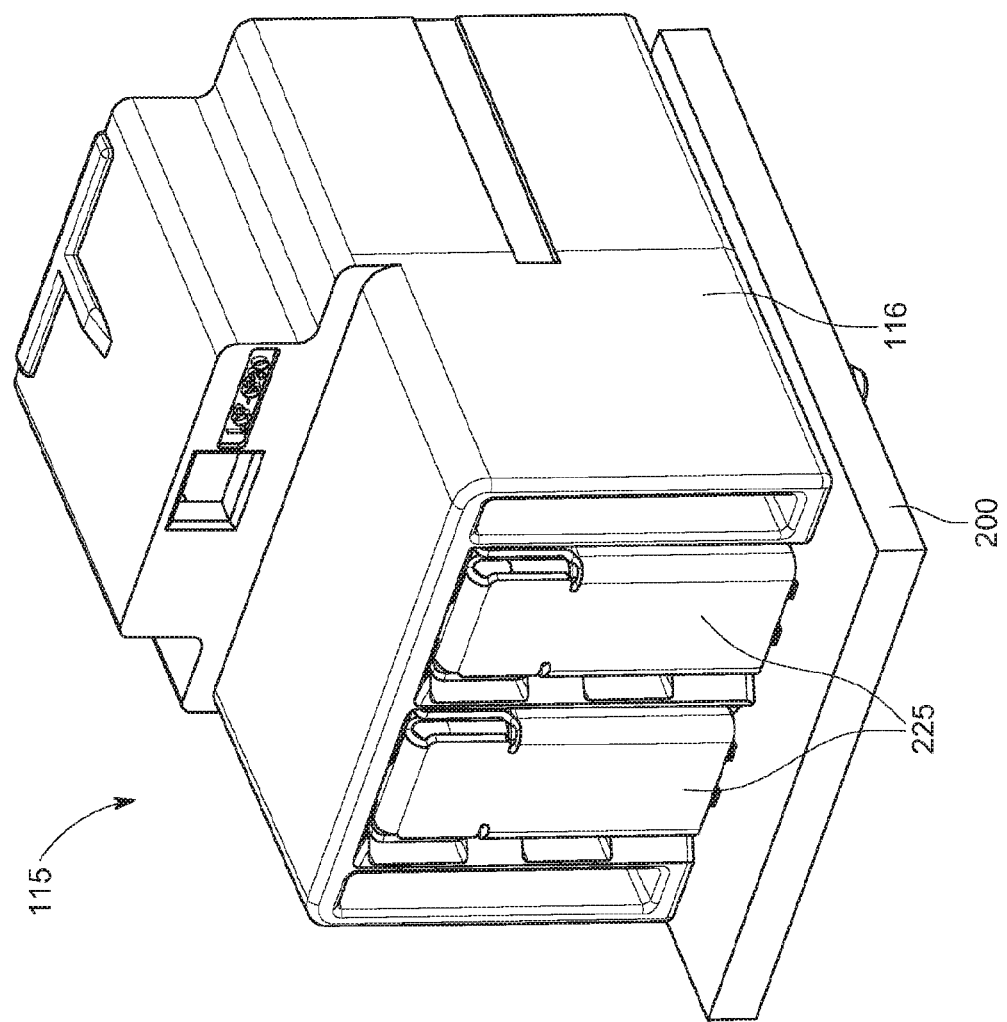
FIG. 24 depicts a rear perspective view of one of the connectors of the vehicle harness connector assembly of FIG. 22.

Referring to FIGS. 22-23, a second embodiment of a connector system 110 is depicted. The connector system 110 includes a first connector assembly 115 and a second connector assembly 170. The connector system 110 is similar to the connector system 10 described above in terms of the number of conductors and the operation of a plurality of 100 ohm differential pair transmission lines. Like components may be depicted with like reference numbers and the description of some components may not be repeated herein.

The first connector assembly 115 includes a housing 116, formed of an insulative material, in which a plurality of terminal modules 125, 225 are disposed. The embodiment depicts four individual terminal modules 125, 225 although any number of modules can be used. The housing 116 is similar to the housing 16 described above except that the housing 116 is configured in a manner to receive the terminal modules 125, 225. As a result, the housing 116 is taller and narrower than the housing 16.

The circuit board 200 includes a layout or footprint 201 having a combination of contact pads 202 and plated through holes 203 that corresponds to the footprint of the array of modules 125, 225 retained within the housing 216. As depicted, the footprint 201 includes pairs of contact pads 202 and plated through holes 203 that are spaced apart and aligned along longitudinal lines parallel to the mating axis M.

Figure 25:
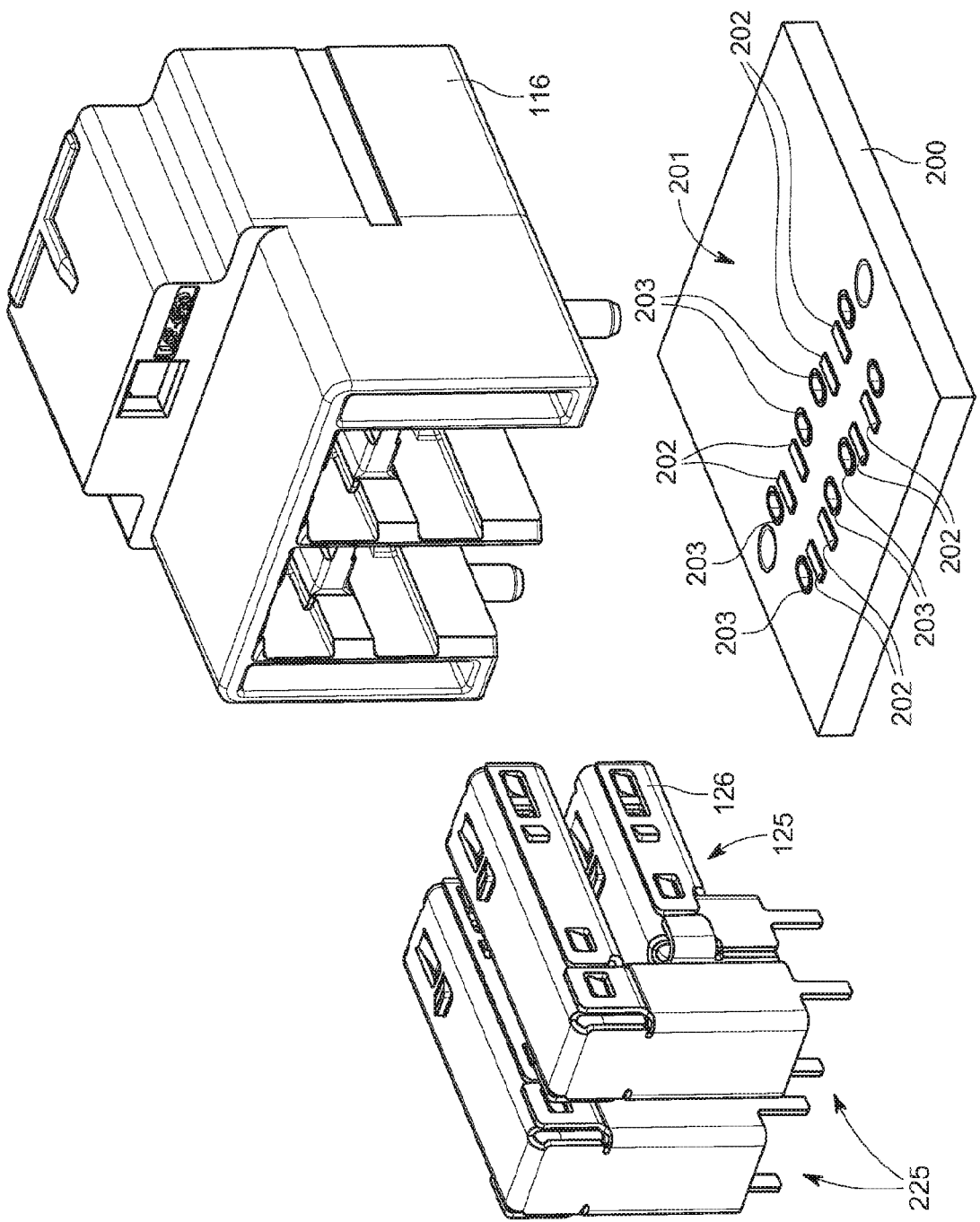
FIG. 25 depicts a partially exploded perspective view of the connector of FIG. 24.
Figure 27:
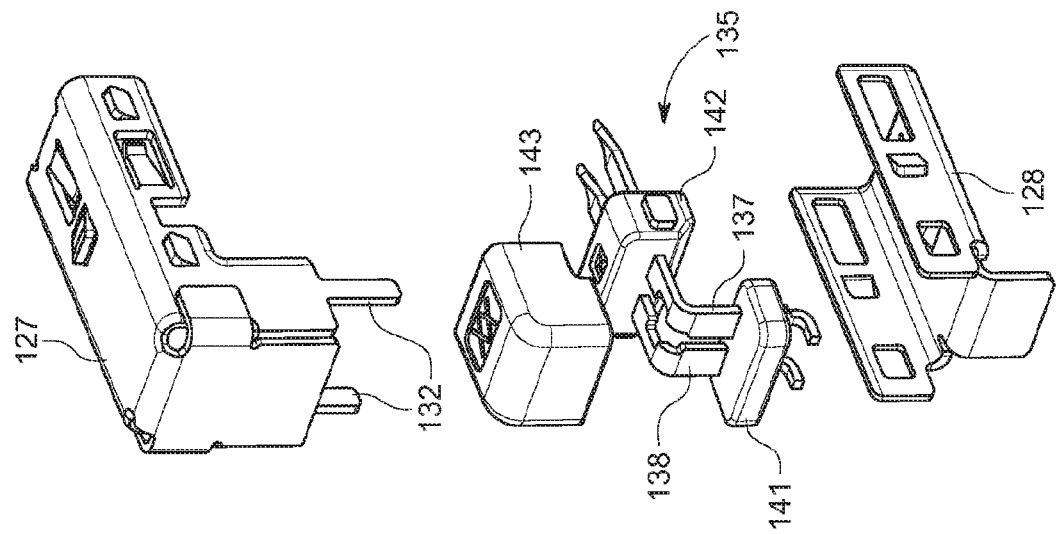
FIG. 27 depicts an exploded rear perspective view of a first embodiment of a terminal module for use with the connector of FIG. 24.
Figure 28:
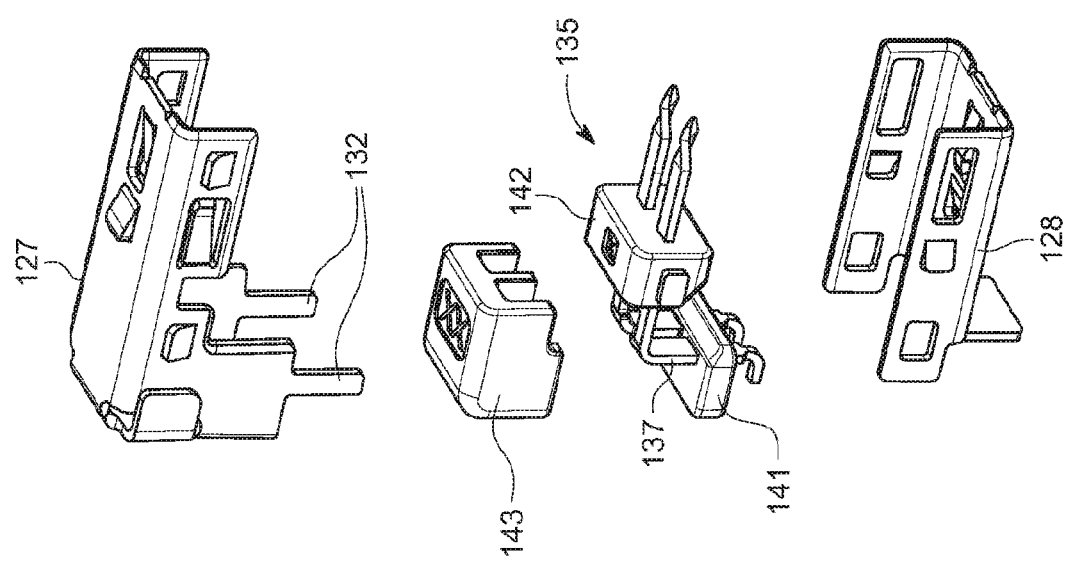
FIG. 28 depicts an exploded front perspective view of the terminal module of FIG. 27

The first connector assembly 115 includes two relatively short right angle terminal modules 125 and two relatively tall right angle terminal modules 225 disposed within housing 116. As best seen in FIGS. 25-26, one short module 125 and one tall module 225 form a nested pair of modules that are aligned parallel to the mating axis M.

Referring to FIGS. 27-32, details of the terminal module 125 are illustrated. The terminal module 125 includes a two-piece conductive shield 126 disposed about a terminal assembly 135. The conductive shield 126 has a first component 127 and a second component 128 and is similar to the conductive shield 26 described above except that the tails 132 of the conductive shield 126 are aligned in a direction transverse to the mating axis M.

The terminal assembly 135 includes a pair of electrically conductive terminals 137, 138 that are bent at right angles and aligned in an edge-to-edge manner. The pair of terminals includes a first terminal 137 and a second terminal 138 that define an edge coupled differential signal pair. The first and second terminals 137, 138 (other than their mating interface sections 158) are identically configured except that they are symmetrical about a centerline extending between each pair of terminals. In other embodiments having a different mating interface, the first and second terminals may be symmetrically configured along their entire length.

Each terminal assembly 135 further includes an insulative housing 140 configured to support the pair of electrically conductive terminals. In an embodiment, the insulative housing 140 includes a first or lower housing member 141 insert molded around a length of the vertical section 146 of the terminals 37, 138 and a second or horizontal housing member 142 insert molded around a length of the horizontal section 155 of the terminals. An intermediate housing member or cover 143 is mounted on the angled section 150 of the terminals, in other words, the intermediate housing member 143 is formed separately from the lower housing member 141 and the horizontal housing member 142 and then mounted on the terminals.

The intermediate housing member 143 includes a right angle bend to follow the bend in the terminals 137, 138 together with a pair of spaced apart inner channels 143a (FIG. 31) along the inner surface of the housing member. A central projection 143b extends downward from an upper inner surface of the intermediate housing member 143 between the terminals 137, 138 to assist in positioning the housing member relative to the terminals. Other configurations of the housing 140 are contemplated. For example, if desired, each of the housing components can be insert molded around the terminals or each can be formed as a separate component and secured to the terminals.

As described above, the terminals 137, 138 and the housing 140 are configured to optimize SI performance with a target of 100 ohms.

Figure 29:
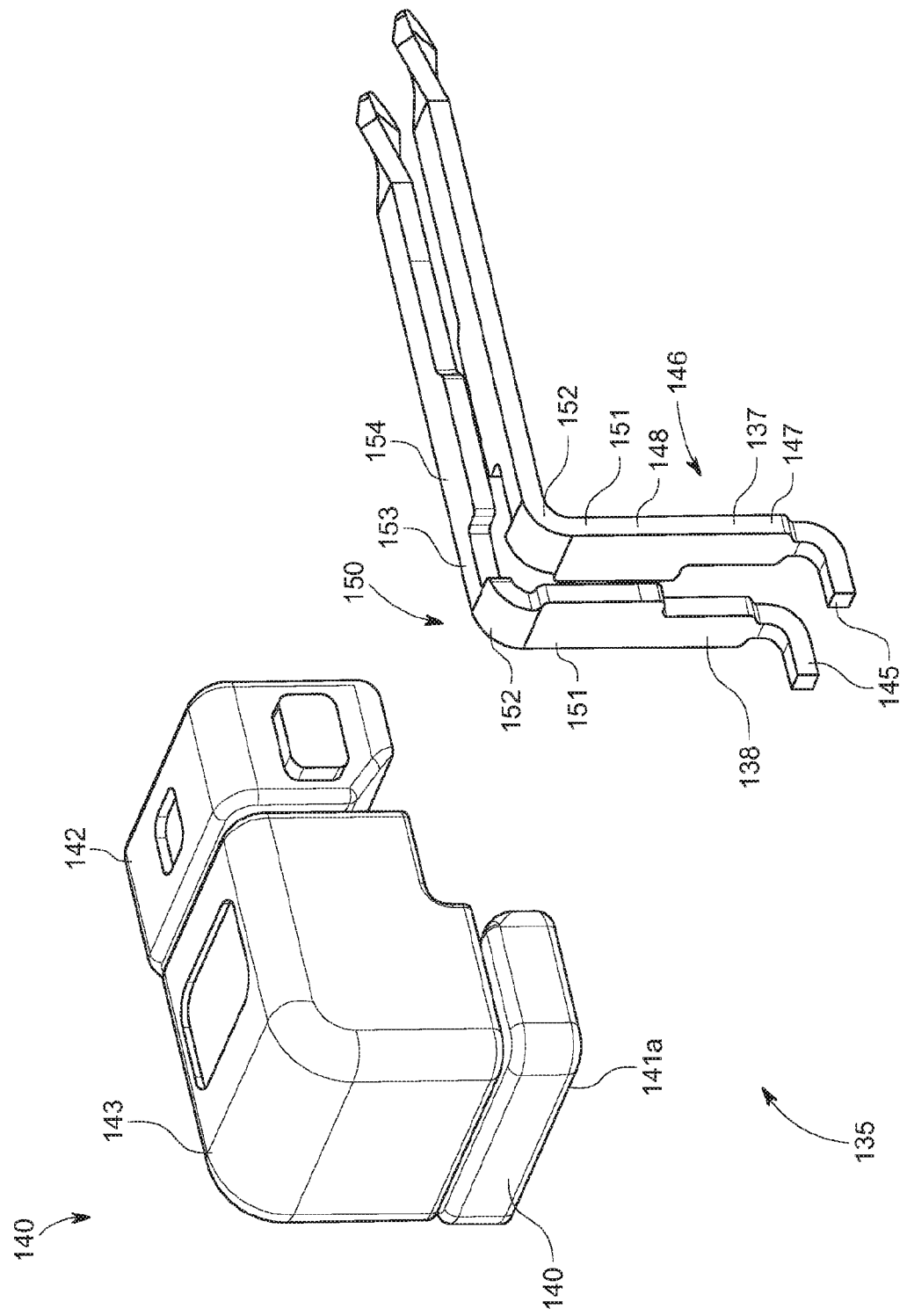
FIG. 29 depicts an exploded rear perspective view of a terminal assembly of the terminal module of FIG. 27.
Figure 30:
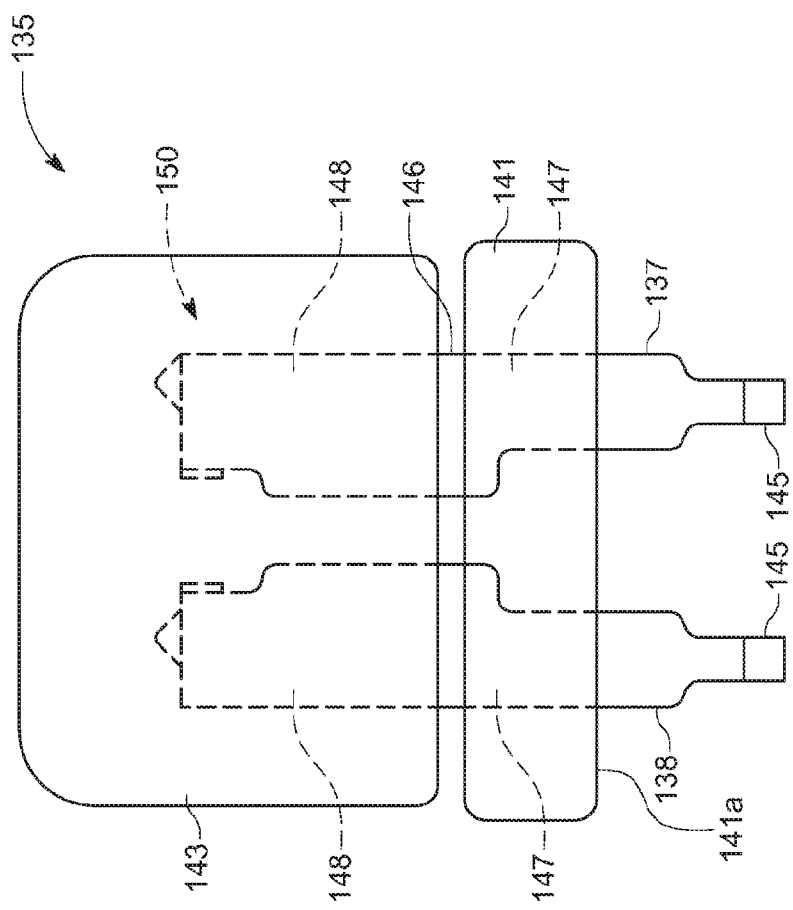
FIG. 30 depicts a rear view of the terminal assembly of FIG. 29.
Figure 31:
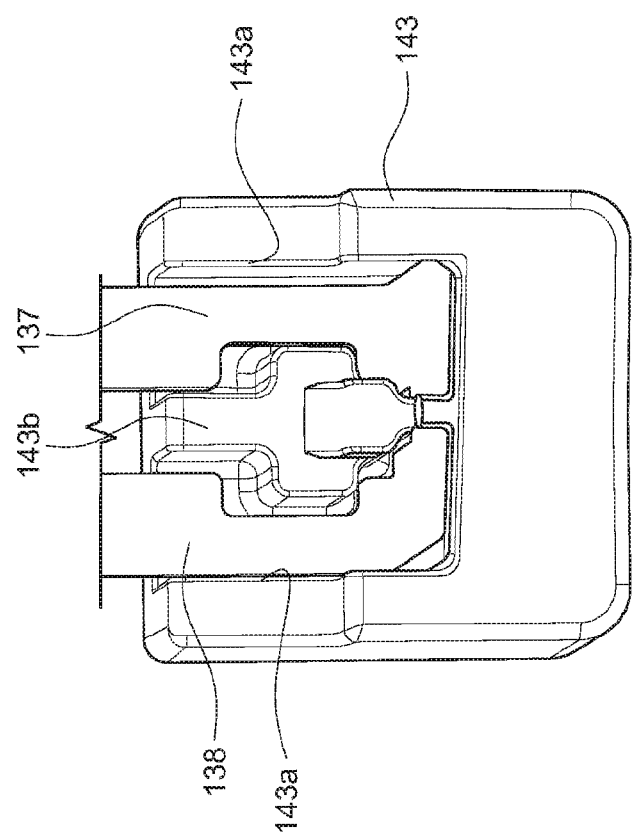
FIG. 31 is a fragmented bottom perspective view of an intermediate housing component and the terminals of the terminal assembly of FIG. 29.
Figure 32:
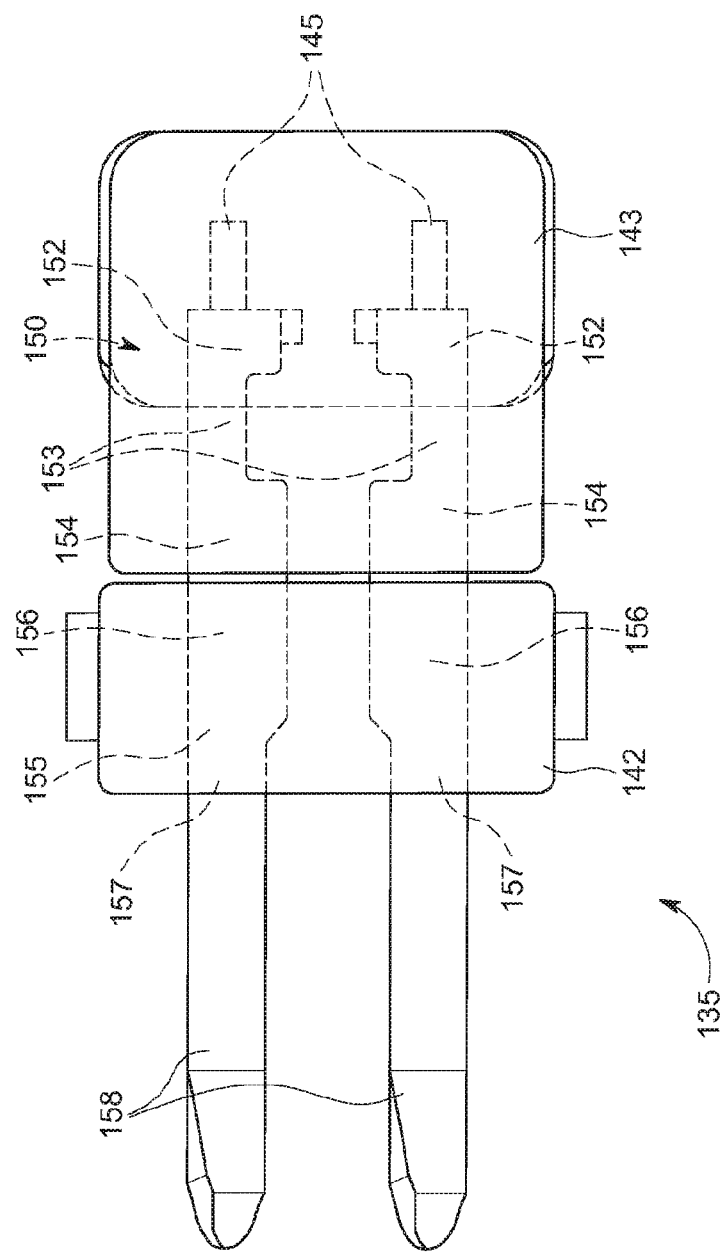
FIG. 32 is a top plan view of the terminal assembly of FIG. 29.
Figure 33:
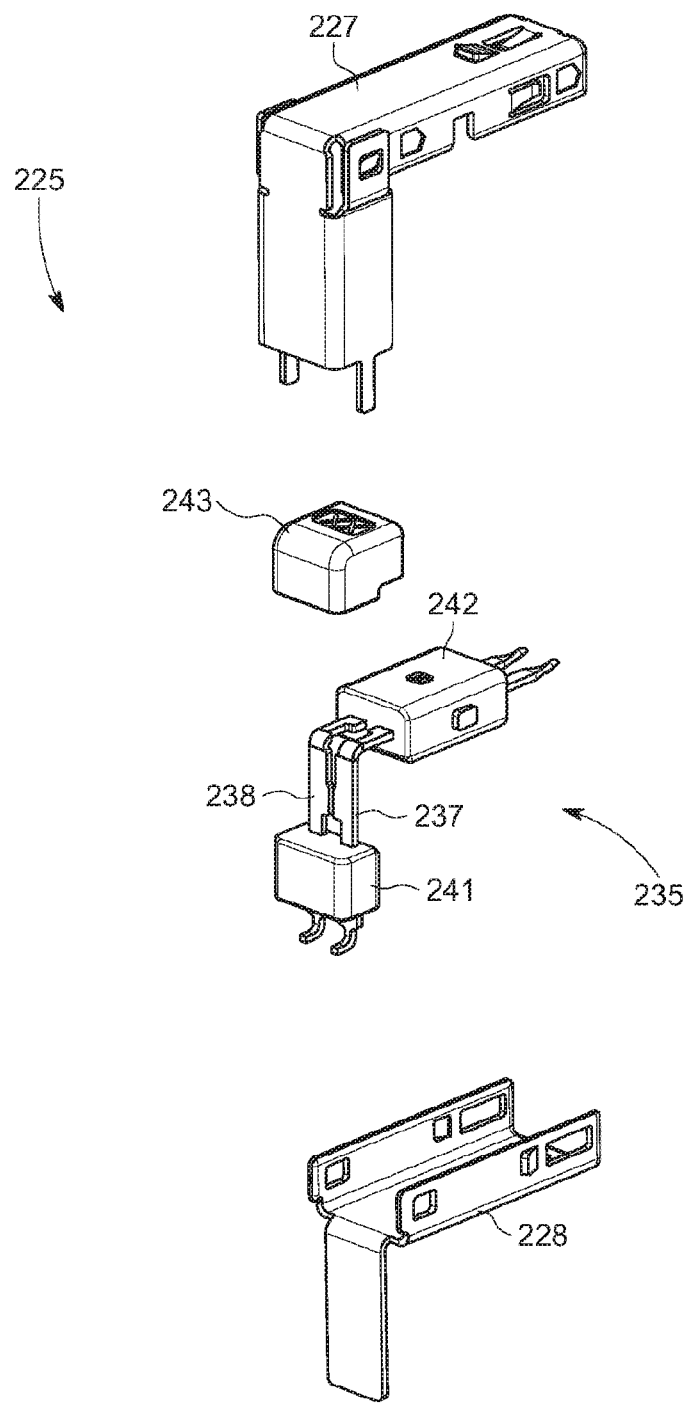
FIG. 33 depicts an exploded rear perspective view of a second embodiment of a terminal module for use with the connector of FIG. 24.
Figure 34:
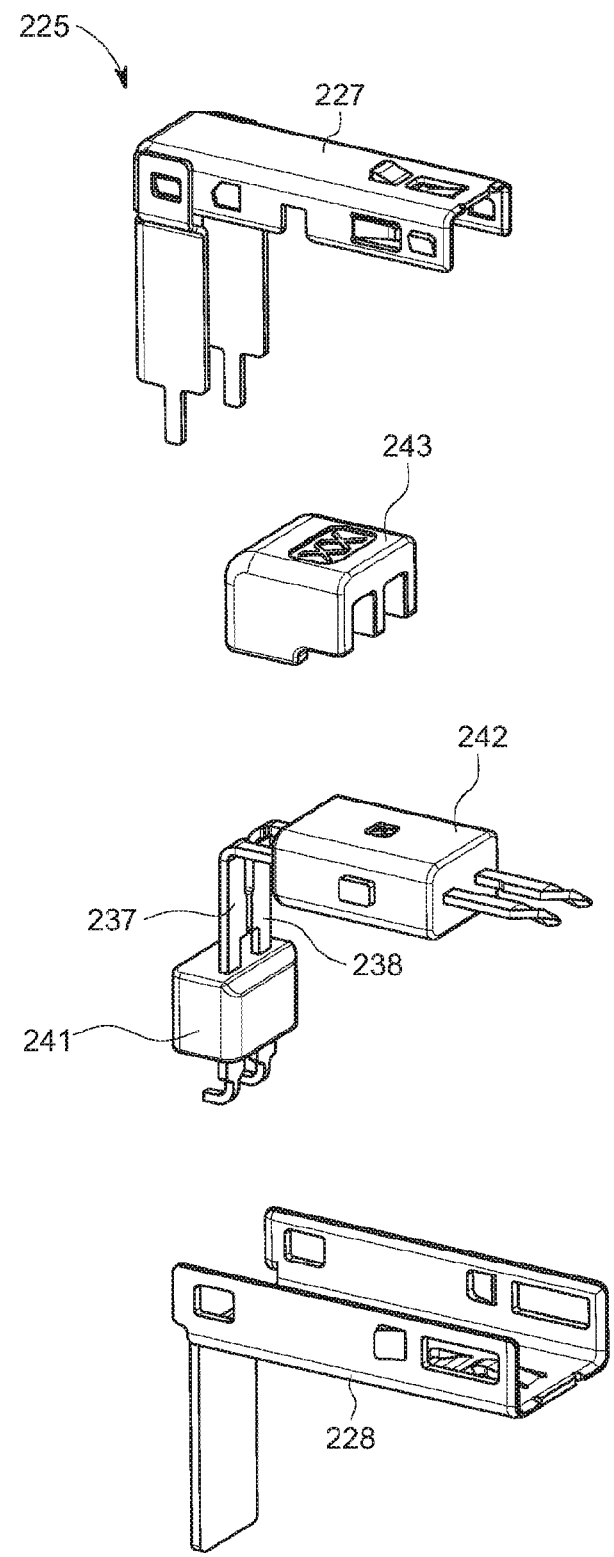
FIG. 34 depicts an exploded front perspective view of the terminal module of FIG. 33.
Figure 35:
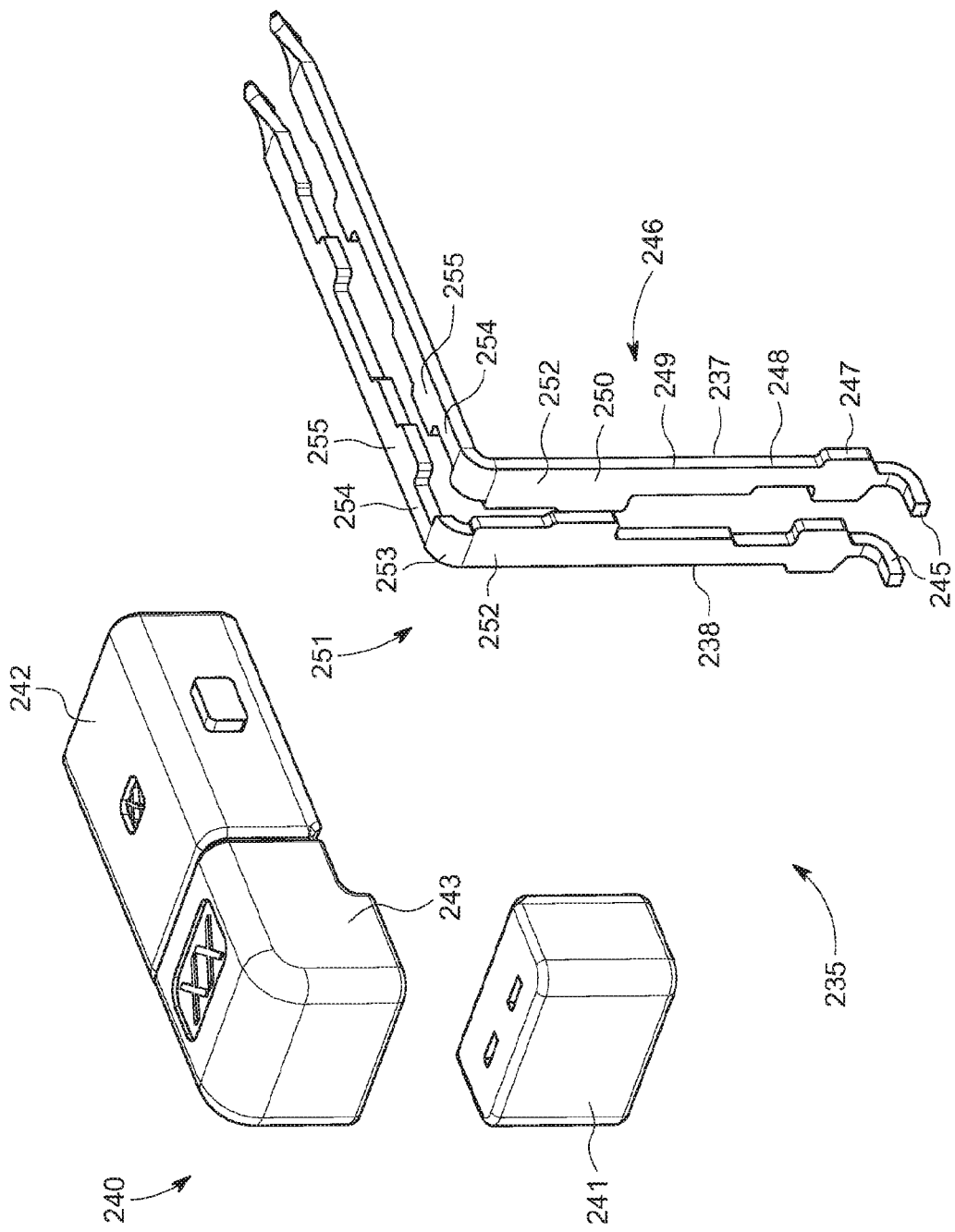
FIG. 35 depicts an exploded rear perspective view of a terminal assembly of the terminal module of FIG. 33.
Figure 36:
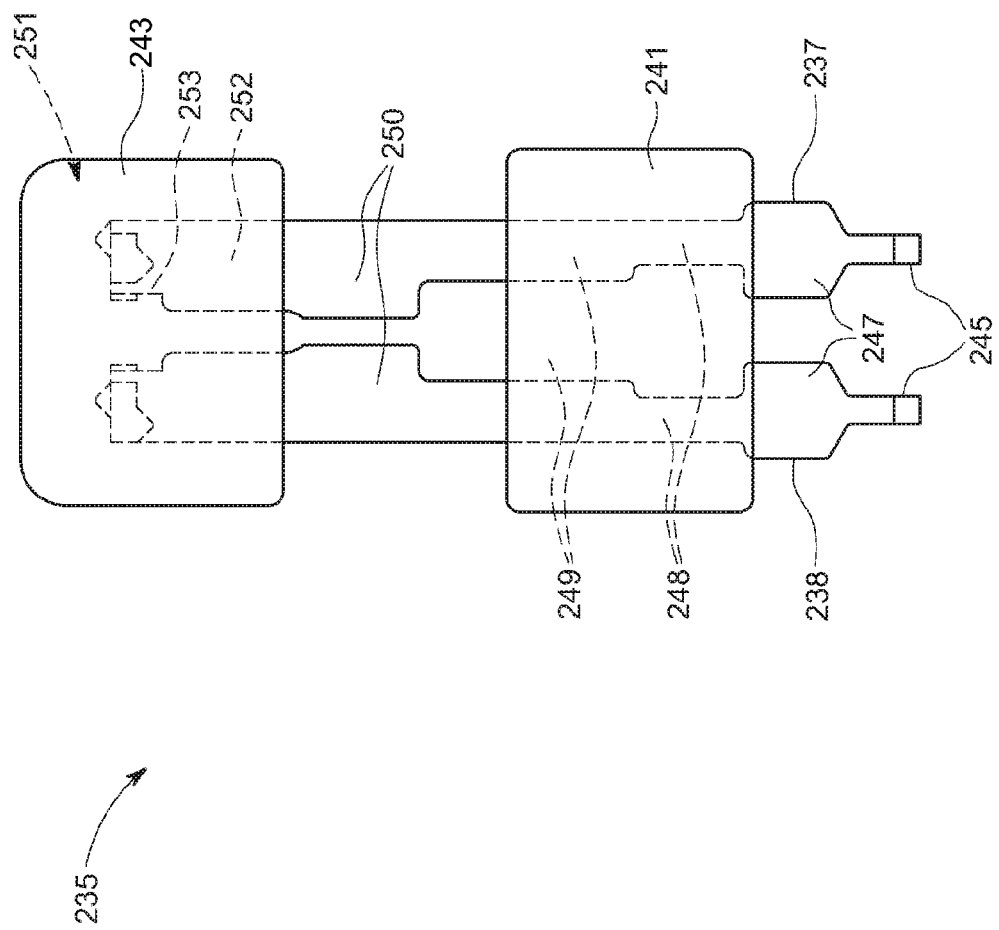
FIG. 36 depicts a rear view of the terminal assembly of FIG. 35.
Figure 37:
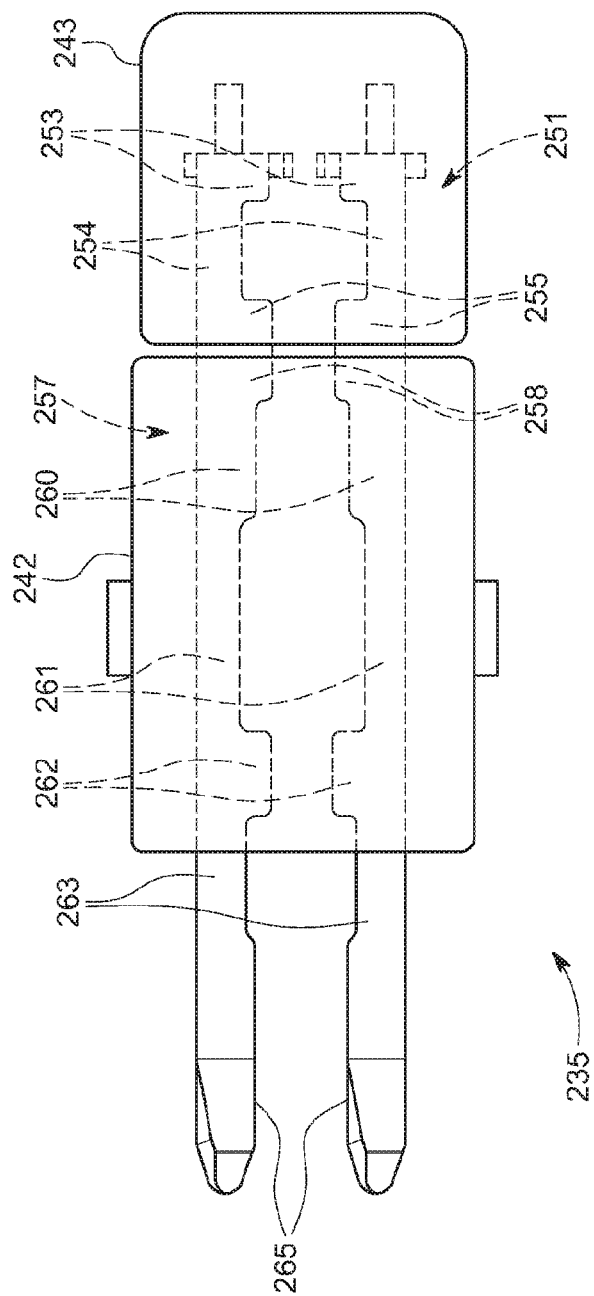
FIG. 37 is a top plan view of the terminal assembly of FIG. 35.

Referring to FIG. 29, the pair of terminals 137, 138 include sequentially a tail section 145, a vertical section 146, an angled section 150, a horizontal section 155, and a mating interface section 158. Unlike the terminals 37, 38 described above, the terminals 137, 138 are disposed side-by-side horizontally and thus are edge coupled and have equal path lengths. Each of the terminals 137, 138 includes a surface mount tail 145 configured to be mechanically and electrically connected to one of the contact pads 202 on the circuit board 200 such as by soldering. The vertical section 146 includes sequentially a first relatively narrow lower portion 147 and a second relatively wide upper portion 148.

A relatively large horizontal gap exists between the contact pads 202 which results in a relatively high impedance at the termination between the surface mount tails 145 and the contact pads. While it may be desirable for the lower housing component 141 to extend downward near the contact pads 202 to facilitate soldering of the surface mount tails 145 to the contact pads, the lower surface 141a of the lower housing component must be at least a specified distance from the contact pads. As a result of the lack of surrounding insulative material and to offset or compensate for the high impedance at the surface mount tails 145, the lower portions 147 of the vertical section 146 of the terminals 137, 138 are relatively wide to provide a desired gap between the adjacent edges of the terminals.

The upper portions 148 of the vertical section 146 of the terminals 137, 138 are relatively wide to decrease the distance between the adjacent edges of the terminals as the terminals from the vertical section to the angled section. The relatively narrow gap between the upper portions 148 functions to reduce the impedance along those portions.

The angled section 150 includes sequentially a vertical portion 151, an angled portion 152, a first horizontal portion 153, and a second horizontal portion 154. The vertical portion 151 extends continuously from the upper portion 148 and has the same width. The angled portion 152 is slightly narrower than the vertical portion 151 which results in a lower impedance. The first horizontal portion 153 has an even narrower width than the angled portion 152. The narrower width of the portion 153 has been found to be desirable to avoid an increase in impedance that is believed to result from the change in direction occurring at the angled portion 152. In other words, it is believed that a significant decrease in impedance would otherwise occur absent the reduction in width of the horizontal portion 153 and the corresponding increase in the distance between the two terminals 137, 138 at the first horizontal portions 153.

The second horizontal portion 154 is wider than the first horizontal portion 153 to lower the impedance of the terminals 137, 138 as they transition from being partially enclosed in insulative material along the intermediate housing member 143 to being fully enclosed in insulative material within the horizontal housing component 142.

The horizontal section 155 (FIG. 32) has a first portion 156 that is the same width as the second horizontal portion 154 of the angled section and is fully enclosed within the insulative material of the horizontal housing member 142 and a second portion 157 that is narrower and operates as a transition to the mating interface section 158 of the terminals. The mating interface sections 158 of the terminals 137, 138 are set to provide a desired distance or pitch between the terminals to optimize both the mating and electrical performance of the connector system 110. In an embodiment, the mating interface sections 158 of the terminals 137, 138 are configured with a low force helix configuration. Terminals 137, 138 having other configurations are contemplated.

Referring to FIGS. 33-37, details of the terminal module 225 are illustrated. The terminal module 225 includes a conductive shield 226 disposed about a terminal assembly 235. The conductive shield 226 has a first component 227 and a second component 228 and is similar to the conductive shield 126 described above except that the vertical and horizontal legs of the conductive shield 226 are longer to accommodate the longer path length of the terminal module 225.

The terminal assembly 235 includes a pair of electrically conductive terminals 237, 238 that are similar to the terminals 137, 138 and are bent at right angles and aligned in an edge-to-edge manner. The pair of terminals 237, 238 define an edge coupled differential signal pair. The first and second terminals (other than their mating interface sections 265) are identically configured except that they are symmetrical about a centerline extending between each pair of terminals. In other embodiments having a different mating interface, the first and second terminals may be symmetrically configured along their entire length.

Each terminal assembly 235 further includes an insulative housing 240 configured to support the pair of electrically conductive terminals 237, 238. The insulative housing 240 is similar to the housing 140 and includes a first or lower housing member 241 insert molded around a length of the vertical section 246 of the terminals 237, 238 and a second or horizontal housing member 242 insert molded around a length of the horizontal section 257 of the terminals. An intermediate housing member or cover 243 is mounted on the angled section 251 of the terminals. The lower housing member 241 is similar to the lower housing member 141 and the horizontal housing member 242 is similar to the horizontal housing member except that the housing members of the terminal assembly 235 are longer along the path of the terminals 237, 238. In other words, the lower housing member 241 is taller than the lower housing member 141 and the horizontal housing member 242 is longer horizontally than the horizontal housing member 142. The intermediate housing member 243 and the intermediate housing member 143 can be identically configured. As described above, other configurations of the housing 240 are contemplated.

The pair of terminals 237, 238 include sequentially a tail section 245, a vertical section 246, an angled section 251, a horizontal section 257, and a mating interface section 258. As stated above, the terminals 237, 238 (other than their mating interface sections 265) are disposed side-by-side and have equal path lengths and thus are identically configured except that they are symmetrical about a centerline extending between each pair of terminals. The surface mount tails 245 are identical to the surface mount tails 145 described above. The vertical section 246 includes sequentially a first relatively wide lower portion 247, a relatively narrow lower intermediate portion 248, an upper intermediate portion 249, and a fourth relatively wide upper portion 250.

As described above, a relatively large horizontal gap exists between the contact pads 202 which results in a relatively high impedance at the termination between the surface mount tails 145 and the contact pads. The limitations on the configuration of the lower housing component 141 results in the lower portions 247 of the vertical section 246 of the terminals 237, 238 being relatively wide to provide a desired distance between the adjacent edges of the terminals to offset or compensate for the high impedance at the surface mount tails.

The lower intermediate portions 248 of the terminals 237, 238 are relatively narrow to increase the distance between the adjacent edges of the terminals since those portions are completely enclosed in the plastic of the lower housing member 241. The upper intermediate portions 249 of the terminals 237, 238 are somewhat narrower than the lower intermediate portions 248 since a length of the intermediate portions is surrounded by plastic of the lower housing member 241 and another length is surrounded by air.

The upper portions 250 are relatively wide to reduce the distance between the terminals and thus increase the impedance of the terminal pair in that area. This has been found to be desirable since the angled sections of the terminals 237, 238 are configured in an identical manner as the angled sections 251 of the terminals 137, 138. Accordingly, the upper portions 250 of the vertical section 246 are configured to compensate for the configuration of the angled section.

As stated above, the angled sections 251 of the terminals 237, 238 are configured in an identical manner as the angled sections 150 of the terminals 137, 138. Accordingly, the angled sections 251 includes sequentially a vertical portion 252, an angled portion 253, a first horizontal portion 254, and a second horizontal portion 255. The functionality of each of the portions together with their interaction with the intermediate housing member 243 are identical to the angled sections 150 of the terminals 137, 138 and the intermediate housing member 143 and therefore the description thereof is not repeated herein.

The horizontal section 257 (FIG. 37) is fully enclosed within the insulative material of the horizontal housing member 242 and has five sequential portions of different widths. The first portion 258 has the same width as the horizontal portion 255 of the angled section 251. A second portion 260 is narrower and operates as a transition to a narrower third portion 261. A fourth portion 262 is wider and functions to decrease the impedance before the terminals narrow at the fifth portion 263. The width of the fifth portion 263 is narrower than the width of the mating interface section 265 of the terminals 237, 238. The mating interface sections 265 of the terminals 237, 238 provide a desired distance or pitch between the terminals to optimize both the mating and electrical performance of the connector system 110. The mating interface sections 265 of the terminals 237, 238 are configured to mate with the mating interface sections 158 of the terminals 137, 138.

Figure 38:
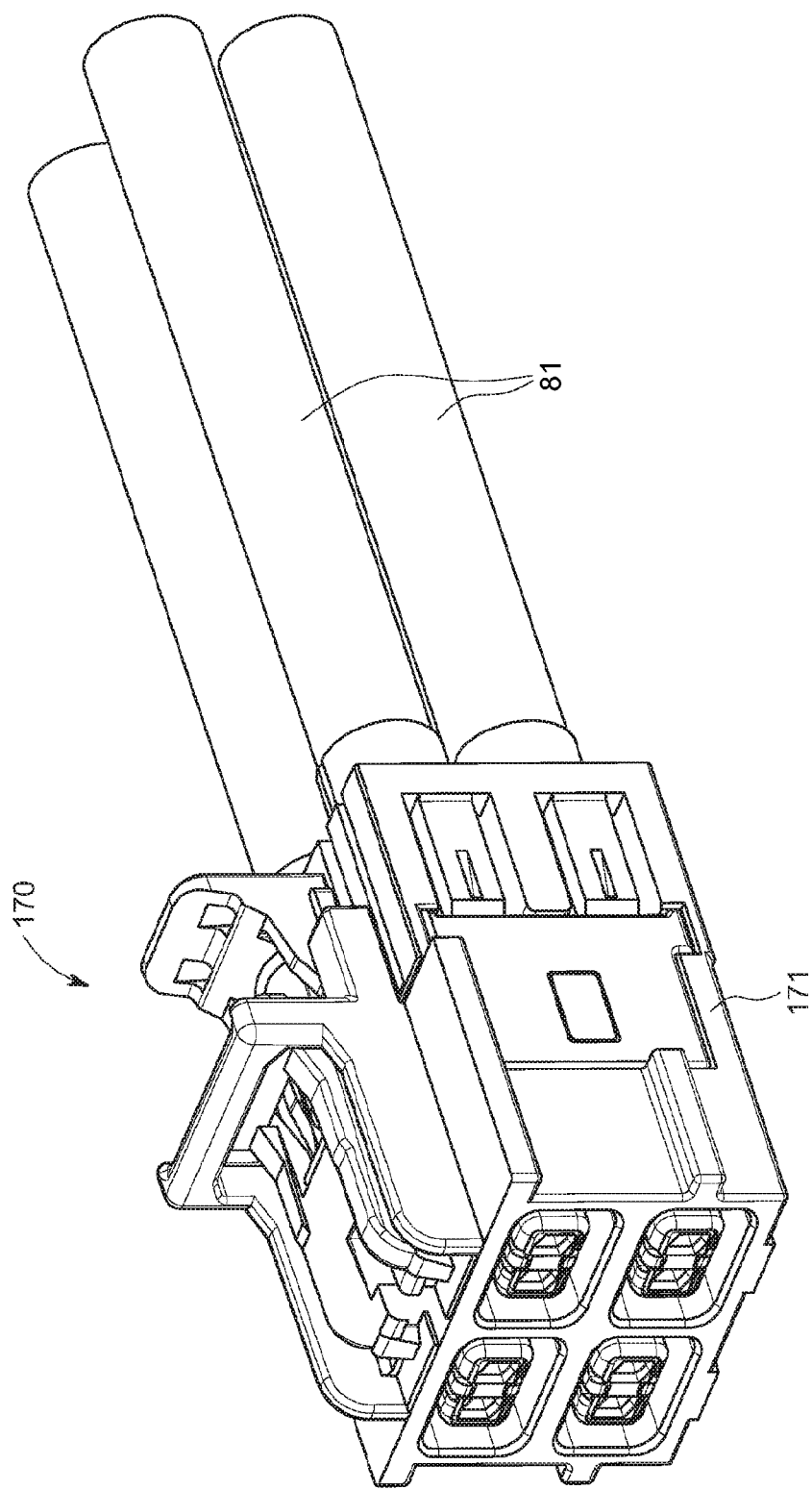
FIG. 38 is a front perspective view of a second connector of the vehicle harness assembly of FIG. 22.
Figure 39:
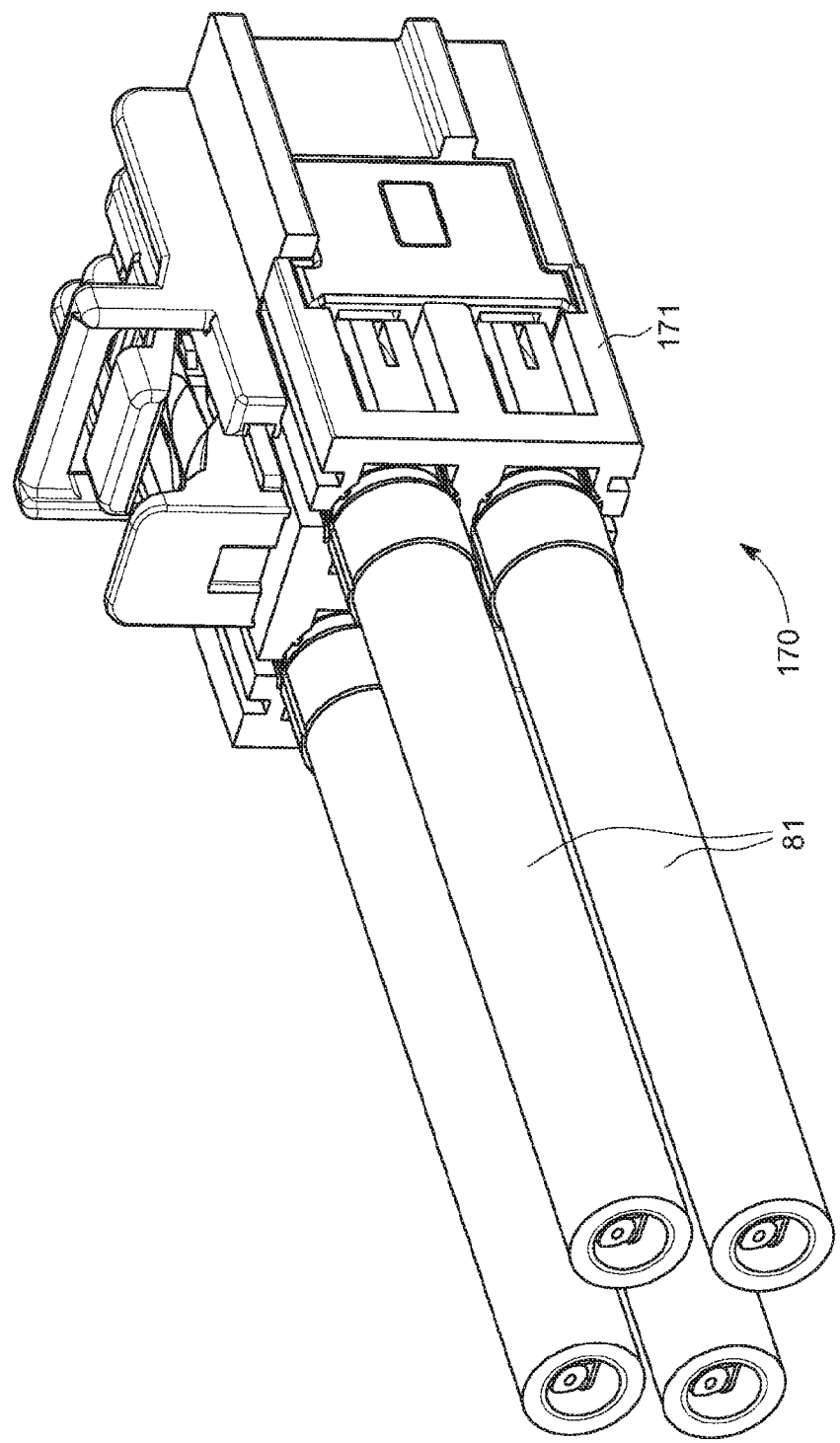
FIG. 39 is a rear perspective view of the connector of FIG. 38.
Figure 40:
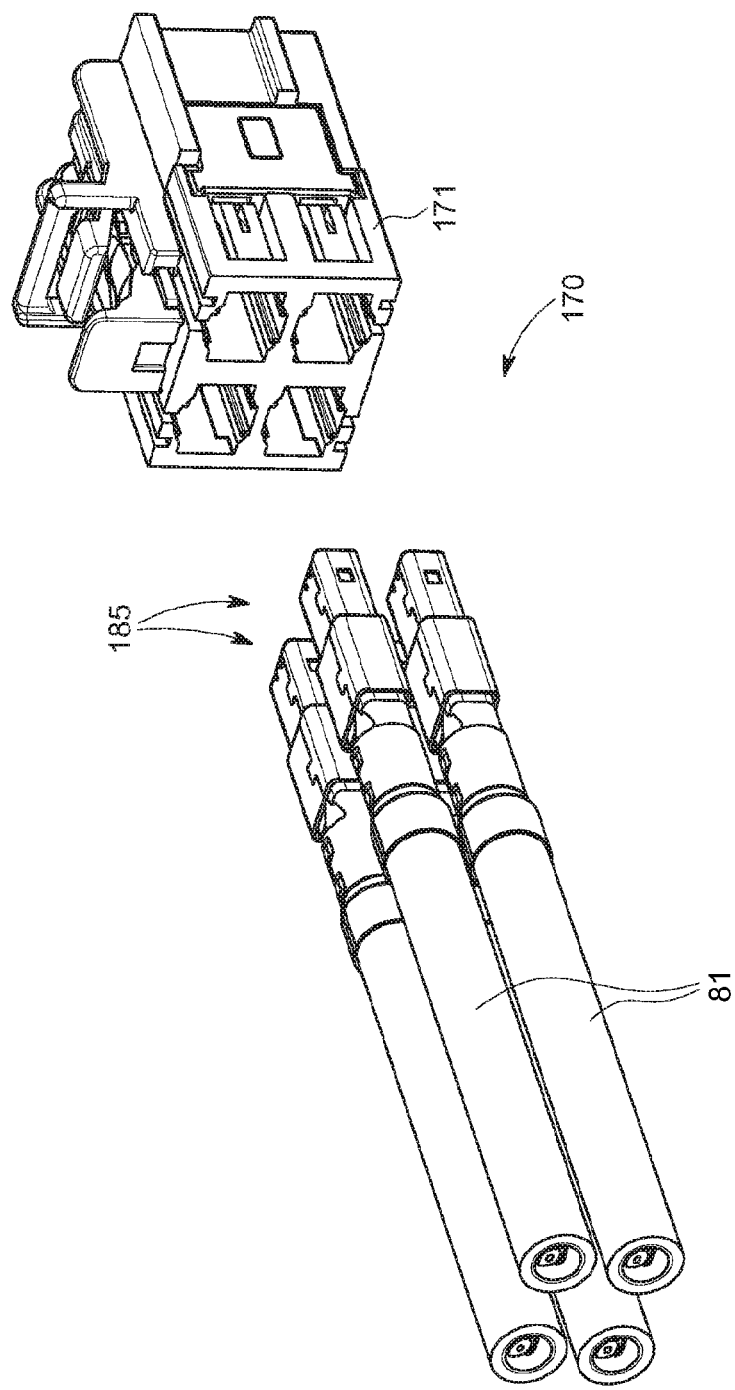
FIG. 40 is a partially exploded perspective view of the connector of FIG. 39.

Referring to FIGS. 38-40, details of the second connector assembly 170 are depicted. Each second connector assembly 170 has a connector housing 171 configured to mate with the receptacle or opening of the first connector housing 116. The connector housing 171 retains four plug connector assemblies 185 therein.

Figure 41:
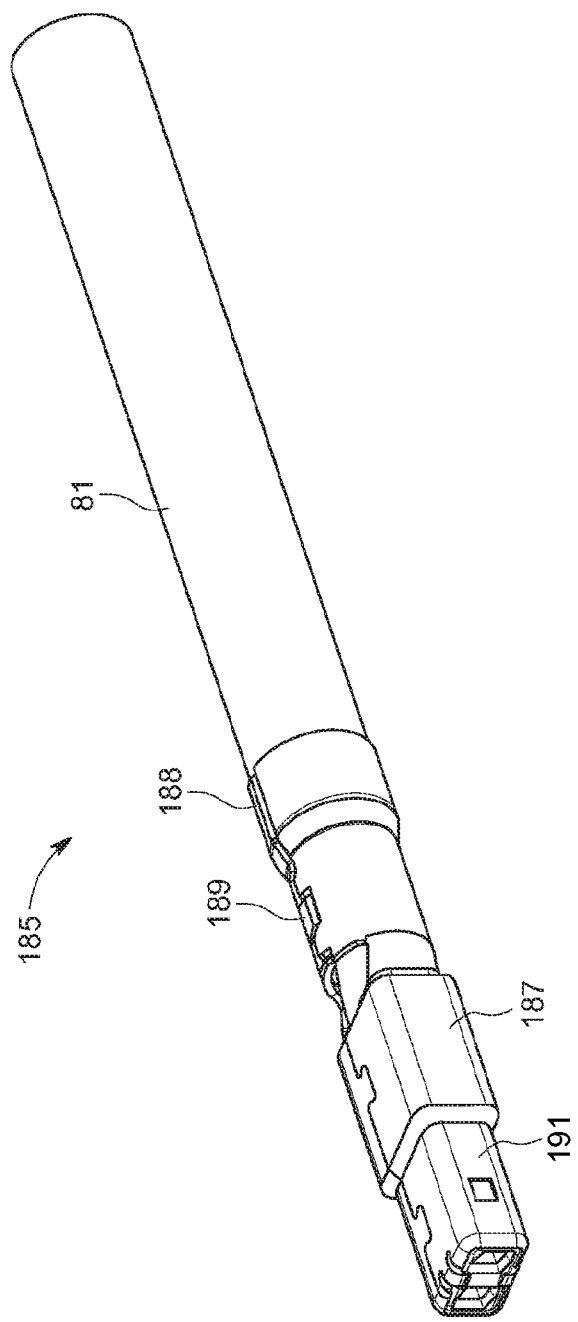
FIG. 41 is a front perspective view of a cable connector assembly for use with the connector of FIG. 38.
Figure 42:
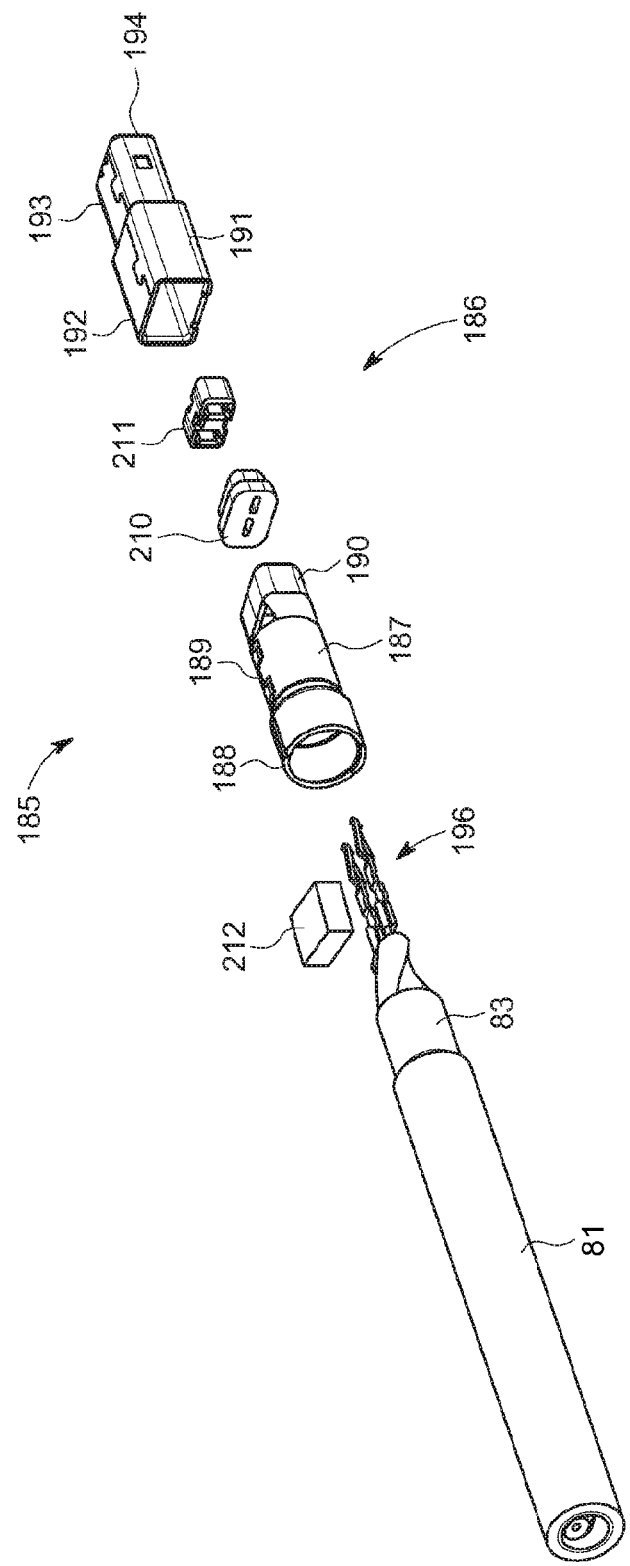
FIG. 42 is a partially exploded rear perspective view of the cable connector assembly of FIG. 41.
Figure 43:
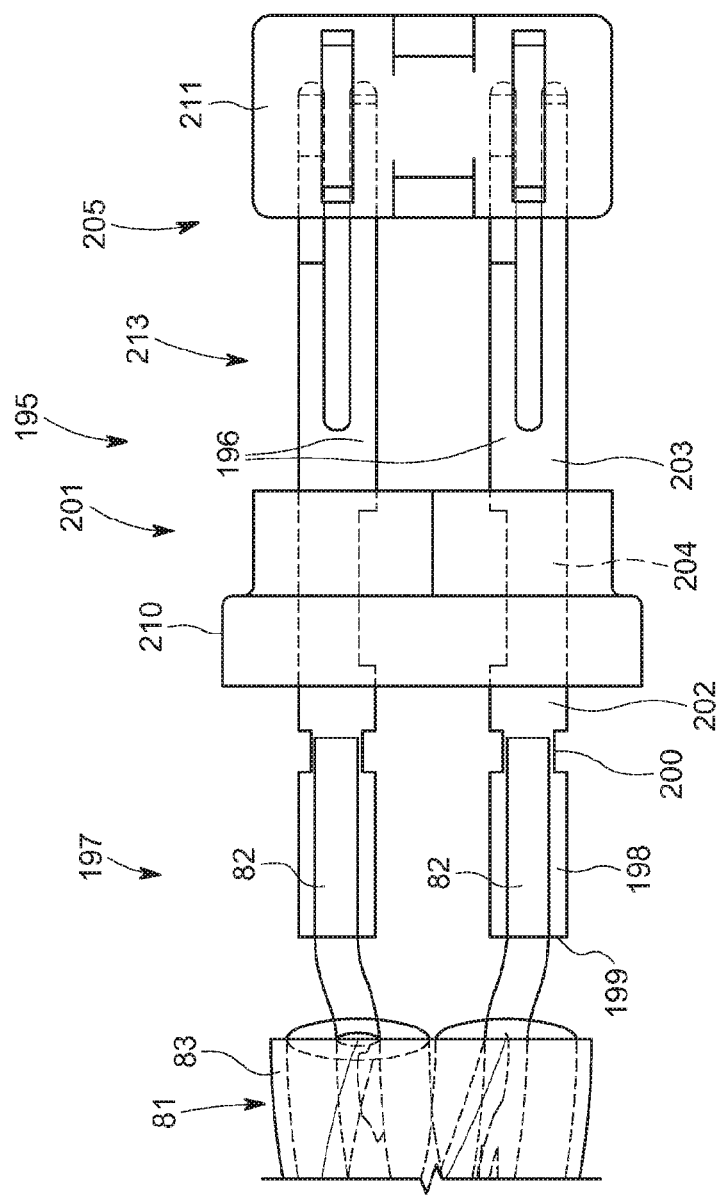
FIG. 43 is a top plan view of an assembled cable and terminal module of the cable connector assembly of FIG. 42.

Referring to FIGS. 41-43, each cable connector assembly 185 includes a conductive shield 186 disposed about a terminal module 195. The shield 186 is generally elongated and includes a first component 187 and a second component 191. The first component 187 includes a first crimp portion 188 configured to be crimped around a portion of the cable 81, a second crimp portion 189 configured to be crimped around to mechanically and electrically connect the shield 186 to the shielding layer 83 of the cable, and a housing retention section 190 configured to mechanically engage the housing component 210. The second shield component 191 has a generally rectangular configuration with a first rectangular portion 192 configured to be secured to the housing retention section 190 and a second rectangular portion 193 having a mating end 194.

The terminal module 195 includes a pair of electrically conductive terminals 196 configured in an edge-to-edge relationship and arranged in a horizontal manner to mate with the terminals 137, 138 of the first connector assembly 115. The terminals 196 (other than the mating interface sections 205) are identically configured except that they are a mirror image about a centerline between the two terminals. The terminals 196 are configured to define an edge coupled differential signal pair in the same manner as the terminals 137, 138 of the first connector assembly 15.

The terminal module 195 further includes an insulative body housing component 210 disposed about each pair of terminals 196. In an embodiment, the insulative body housing component 210 may be insert molded around the terminals 196 in a manner similar to that described above with respect to the terminals 137, 138. In addition, a separate insulative mating housing component 211 is disposed within and supported by the shield 186 in a manner spaced from the body component 210 and adjacent the mating end 194 of the second rectangular portion 193. Further, the terminals 196 and the mating housing component 211 are configured so that the mating ends 205 of the terminals are disposed in and spaced from the mating housing component. More specifically, the mating housing component 211 has openings in the end to permit deflection of the mating ends 205 without contacting the mating housing component.

As with the terminals 137, 138 of the first connector assembly 115, the terminals 196 of the second connector assembly 170 include specific spacing and geometry and interact with the insulative housing components 210, 211 and the shield 186 to optimize SI performance of each differential signal pair. The terminals 196 are also configured to maintain the 100 ohm impedance of the entire connector system 10. In embodiments, it may be desirable to minimize the size of the housing components 210, 211 in the mating direction to reduce the impact of housing components and the mating interface on reaching the 100 ohm target, More specifically, by providing the gap or space 213 (FIG. 43) between the body housing component 210 and the mating housing component 211, the impedance along the gap 213 is increased to compensate for the decreases in capacitance due to the housing components and the mating interface.

Referring to FIG. 43, the terminals 196 include sequentially a termination section 197, a body section 201, and a mating interface section 205. The termination section 197 is configured to be soldered or otherwise mechanically and electrically connected to the signal conductors 82 of the cable 81. The termination section 197 includes a first portion 198 at the first end 199 of the terminal 196 and a second reduced width portion 200 spaced from the first end of the terminal.

The body section 201 is depicted as having two spaced apart planar sections 202, 203 with a bend section 204 therebetween. The bend section 204 and portions of the planar sections 202, 203 include a narrowed length to control the impedance as a result of the insulative housing 210 molded over the body section 201.

The mating interface section 205 of the terminals 196 is configured as a receptacle of a low force helix mating system in order to mate with the terminals 137, 138 of the first connector assembly 115.

During assembly of the cable connector assembly 185 of the second connector assembly 170, the terminals 196 are soldered to the signal conductors 82 of the cable 81. A dispensed or molded insulator 212 is subsequently formed around the terminated portions of the signal conductors 82 and the termination section 197 of the terminals 196. The terminated cable 81 and terminal module 195 may be inserted into the first component 187 of the shield 186 and the crimp portions 188, 189 crimped to the cable 81. The second shield component 191 may be secured to the first shield component 187 to fully enclose the terminal module 195.

In an embodiment, the mating housing 211 may be disposed in the mating end of the second shield component 191 prior to interconnecting the first shield component 187 and the second shield component. In another embodiment, the mating housing 211 may be inserted after assembling the first shield component 187 and the second shield component 191 together.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. An electrical connector, comprising:
   a first housing having an opening, the first housing including a mating end and a mourning end; and
   a terminal module positioned in the opening, the terminal module including a second housing formed of an insulative material that extends in a mating direction, the second housing supporting a pair of terminals that are differentially coupled, each of the terminals having a horizontal portion that extends in the mating direction and ends at a terminal mating end, the terminal module further including a conductive shield positioned around the second housing, the conductive shield substantially extending from one of the mating end or the mounting end along the second housing, the conductive shield extending in the direction of the mating end past the terminal mating end.

2. The electrical connector of claim 1, wherein the first housing includes a mating bay position in the opening, the mating bay defined by two opposing walls.

3. The electrical connector of claim 1, wherein the shield includes two tails that are configured to be inserted into plated through holes.

4. The electrical connector of claim 1, wherein the second housing supports two terminals in a vertical alignment.

5. The electrical connector of claim 4, wherein the second housing supports two terminals in a horizontal alignment.

6. The electrical connector of claim 5, wherein the second housing comprises a horizontal housing member and a lower housing member that are both separate from each other.

7. The electrical connector of claim 1, wherein the terminals have tails that are configured to be mounted on contact pads on a printed circuit board.

8. The electrical connector of claim 1, wherein the connector is configured in a right angle arrangement.

9. The electrical connector of claim 1, further comprising a cable with an insulative layer that supports a pair of signal conductors, wherein the each one of the pair of signal conductors are connected to one of terminals of the pair of terminals.

10. The electrical connector of claim 9, wherein the cable further includes a shielding layer provided around the insulative layer, the shielding layer electrically connected to the conductive shield.

11. The electrical connector of claim 10, wherein the conductive shield is crimped to the shielding layer.

12. The electrical connector of claim 11, wherein the differential impedance is maintained substantially the same through the connector system.

\* \* \* \* \*

UNITED STATES PATENT AND TRADEMARK OFFICE
CERTIFICATE OF CORRECTION

| | | |
|---|---|---|
| PATENT NO. | : 11,563,291 B2 | Page 1 of 1 |
| APPLICATION NO. | : 16/960018 | |
| DATED | : January 24, 2023 | |
| INVENTOR(S) | : Gilkey et al. | |

It is certified that error appears in the above-identified patent and that said Letters Patent is hereby corrected as shown below:

On the Title Page

In Item (57), in "Abstract", in Column 2, Line 4, delete "a" and insert --at-- therefor In the Claims In Column 14, Line 27, in Claim 1, delete "mourning" and insert --mounting-- therefor In Column 14, Line 44, in Claim 3, after "wherein the", insert --conductive--

In Column 14, Line 57, in Claim 8, after "wherein the", insert --electrical--

In Column 15, Line 5, in Claim 12, delete "connector system." and insert --electrical connector.-- therefor Signed and Sealed this
Fourth Day of March, 2025

Coke Morgan Stewart
*Acting Director of the United States Patent and Trademark Office*